US012149877B2

(12) United States Patent
Lee et al.

(10) Patent No.: US 12,149,877 B2
(45) Date of Patent: Nov. 19, 2024

(54) SOUND DEVICE

(71) Applicant: LG ELECTRONICS INC., Seoul (KR)

(72) Inventors: Giljae Lee, Seoul (KR); Yonghyuk Na, Seoul (KR); Juchul Yun, Seoul (KR); Jongjin Kim, Seoul (KR); Hyunseung Yu, Seoul (KR); Seunghark Paek, Seoul (KR); Sooyong Song, Seoul (KR); Heuisik Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 17/885,962

(22) Filed: Aug. 11, 2022

(65) Prior Publication Data

US 2023/0353921 A1 Nov. 2, 2023

(30) Foreign Application Priority Data

Apr. 28, 2022 (KR) ........................ 10-2022-0053021

(51) Int. Cl.

*H04R 1/10* (2006.01)
*G10K 11/175* (2006.01)
*H04R 1/28* (2006.01)

(52) U.S. Cl.

CPC ......... *H04R 1/1016* (2013.01); *G10K 11/175* (2013.01); *H04R 1/105* (2013.01); *H04R 1/2811* (2013.01); *G10K 2210/1081* (2013.01)

(58) Field of Classification Search

CPC . H04R 1/02; H04R 1/08; H04R 1/083; H04R 1/10; H04R 1/1016; H04R 1/105; (Continued)

(56) References Cited

U.S. PATENT DOCUMENTS 4,532,649 A * 7/1985 Bellafiore .............. H04R 25/65 381/328
2014/0126733 A1 5/2014 Gauger, Jr. et al.
(Continued)

FOREIGN PATENT DOCUMENTS

CN 114125622 A * 3/2022 ............... H04R 1/08
EP 3 637 789 A1 4/2020
(Continued)

OTHER PUBLICATIONS

English Translation of CN-114125622-A, Date: Mar. 1, 2022.*

*Primary Examiner* — Paul Kim

(74) *Attorney, Agent, or Firm* — Birch, Stewart, Kolasch & Birch, LLP

(57) ABSTRACT

A sound device including a transducer, a housing accommodating the transducer, the transducer having a front chamber and a back chamber that face each other with respect to the transducer, and a microphone disposed inside the front chamber. The housing includes a speaker hole located at an outer surface of the housing at a portion of the front chamber, an air hole located at the outer surface of the housing at a rear portion of the back chamber, and an inner space configured to allow air passing through the air hole to flow into the front chamber therethrough independent of the back chamber. The transducer outputs sound based on sound information received by the microphone.

20 Claims, 18 Drawing Sheets

(58) Field of Classification Search

CPC .. H04R 1/1058; H04R 1/1075; H04R 1/1083; H04R 1/2811; H04R 1/2803; H04R 1/2823; H04R 1/2826; H04R 1/2846; H04R 1/2849; H04R 1/2873; H04R 1/2896; H04R 3/002; H04R 3/005; H04R 3/12; H04R 2400/01; H04R 2410/01; H04R 25/65; H04R 1/1091; G10K 11/175; G10K 2210/1081

USPC .......................................................... 381/380

See application file for complete search history.

(56) References Cited

U.S. PATENT DOCUMENTS

| | | | | |
|---|---|---|---|---|
| 2014/0294222 | A1* | 10/2014 | Sapiejewski | H04R 1/1083 381/371 |
| 2014/0348372 | A1* | 11/2014 | Seo | H04R 1/1016 381/380 |
| 2020/0090636 | A1 | 3/2020 | Yang | |
| 2021/0021920 | A1* | 1/2021 | Choi | H04R 1/1016 |
| 2021/0144462 | A1* | 5/2021 | Kim | H04R 1/1083 |
| 2021/0295815 | A1* | 9/2021 | Yamabe | H04R 1/10 |

FOREIGN PATENT DOCUMENTS

| | | | |
|---|---|---|---|
| EP | 3 833 042 | A1 | 6/2021 |
| KR | 10-2015-0096600 | A | 8/2015 |
| KR | 10-1558091 | B1 | 10/2015 |
| KR | 10-2059001 | B1 | 12/2019 |

* cited by examiner

SOUND DEVICE

CROSS-REFERENCE TO RELATED APPLICATION

This application claims the priority benefit of Korean Patent Application No. 10-2022-0053021, filed on Apr. 28, 2022, the disclosure of which is incorporated herein by reference in its entirety.

TECHNICAL FIELD

The present disclosure relates to a sound device.

BACKGROUND

A sound device is an apparatus that receives a sound signal, converts the received sound signal into a signal that a user can hear, and provides the converted signal. In recent years, wireless sound devices have been widely used in accordance with requirements for portability and ease of use.

Meanwhile, as technologies develop, there is an increasing demand for a sound device that provides an active noise canceling (ANC) function that blocks ambient noise, and has improved sound quality.

SUMMARY

An object of the present disclosures is to solve the above and other problems.

Another object may be to provide a sound device including an active noise canceling function.

Another object may be to provide a sound device having a high level of noise canceling performance.

Another object may be to provide a sound device having an improved sound performance.

Another object may be to provide a sound device having an improved internal pressure that may occur when worn.

Another object may be to provide a sound device having an improved waterproof performance.

According to an aspect of the present disclosure for achieving the above and other objects, a sound device includes: a transducer; a housing accommodating the transducer, and having a front chamber and a back chamber that face each other with respect to the transducer; and a microphone disposed inside the front chamber, wherein the housing includes: a speaker hole formed from an outer surface of the housing toward the front chamber; and a hole formed from the outer surface of the housing toward the outside of the back chamber; wherein air that has passed through the hole flows into the front chamber through an inner space of the housing independent of the back chamber, wherein the transducer outputs sound based on sound information received by the microphone.

BRIEF DESCRIPTION OF THE DRAWINGS

The above and other objects, features and advantages of the present invention will be more apparent from the following detailed description in conjunction with the accompanying drawings, in which.

DETAILED DESCRIPTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

A sound device 10 according to the present disclosure may be an apparatus that outputs a sound signal that a user can hear. For example, the sound device 10 may be provided as at least one device of an earphone, a headphone, an earset, or a headset. The sound device 10 may be provided as a wired device or a wireless device. However, the present disclosure is not limited thereto, and the sound device 10 according to the present disclosure may include various types of devices that receive a sound signal, and convert or output the received signal into a signal that a user can hear.

Figure 1:
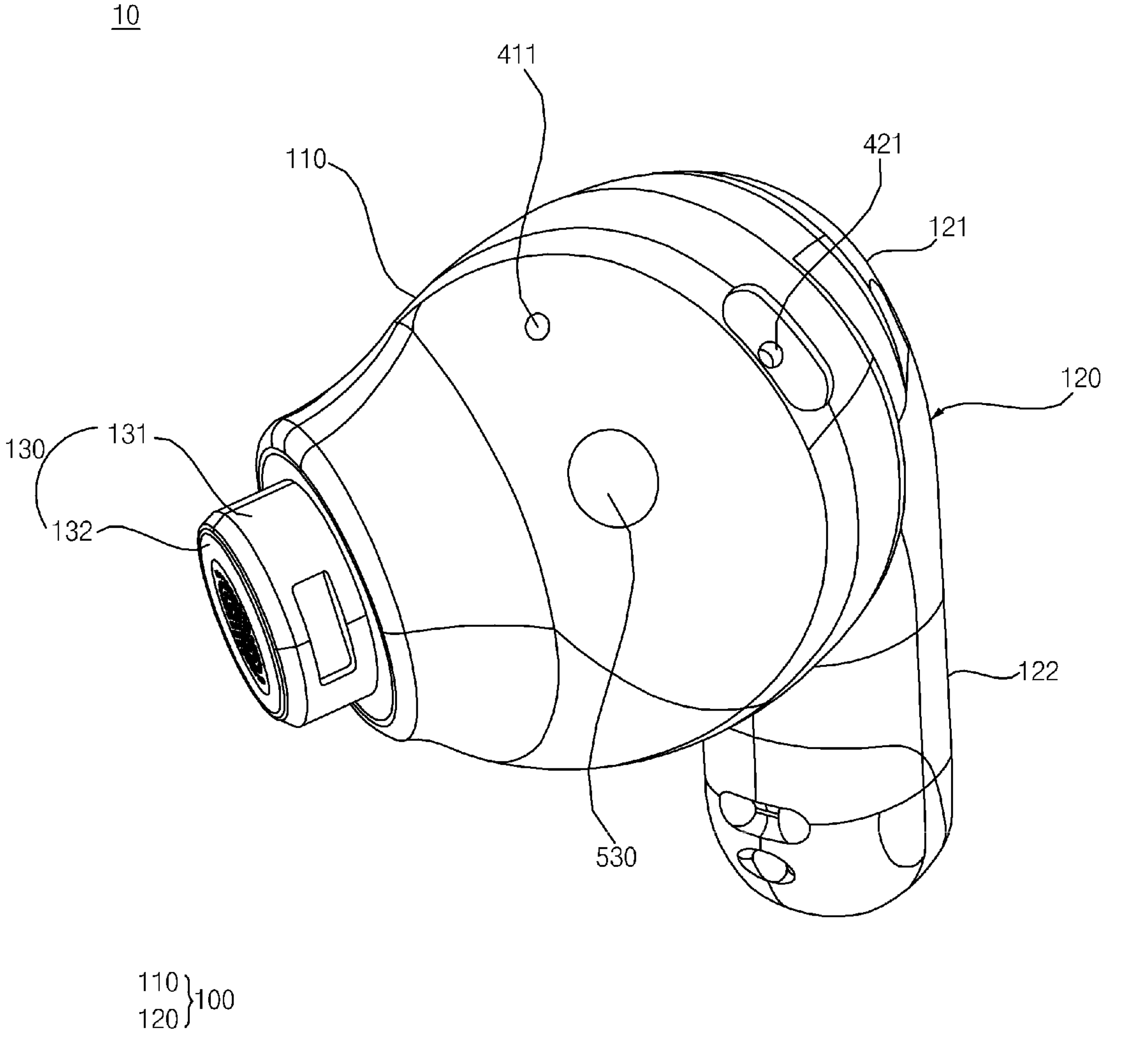
FIGS. 1 to 18 are diagrams illustrating examples of a sound device according to embodiments of the present disclosure.

Referring to FIG. 1, the sound device 10 may include a housing 100. The housing 100 may form an outer shape of the sound device 10. The housing 100 may include a bottom cover 110 and a top cover 120 coupled to the bottom cover 110. The top cover 120 may be coupled to one side of the bottom cover 110, and a nozzle 130 may be coupled to the other side of the bottom cover 110. The nozzle 130 may be a portion inserted into user's ear, when the sound device 10 is worn by a user. The sound output from the sound device 10 may be transmitted to a user through the nozzle 130.

At least a portion of the bottom cover 110 may be inserted into user's ear when the sound device 10 is worn by a user. The remaining portion of the bottom cover 110 may not be inserted into user's ear, but may be exposed to the outside, when the sound device 10 is worn by a user. The top cover 120 may be exposed to the outside, when the sound device 10 is worn by a user.

The top cover 120 may include a head portion 121 coupled to the bottom cover 110, and an extension portion 122 extending downwardly from at least a portion of the head portion 121. A charging terminal, a microphone, or the like may be located in the extension portion 122. A plurality of microphones may be disposed in the top cover 120. For example, a main microphone and an outer microphone may be disposed in the top cover 120. The outer microphone and the main microphone may be located in the extension portion 122. In this case, the outer microphone may be located in a higher position on the extension portion 122 than the main microphone. Alternatively, the main microphone may be located in the extension portion 122, and the outer microphone may be located in the head portion 121. For example, the main microphone may be located in the lower end of the extension portion 122. The main microphone may be a microphone for calls. The outer microphone may be a sound-collecting microphone for noise canceling. The outer microphone may be exposed to the outside. The sound device 10 may be capable of canceling noise in a feed-forward manner through the outer microphone.

A direction from the top cover 120 toward the nozzle 130 may be referred to as a forward direction, and a direction opposite to this may be referred to as a rearward direction. A direction which is perpendicular to the front-rear direction and parallel to the extending direction of the extension portion 122 may be referred to as an up-down direction or a vertical direction. A direction which is perpendicular to both the front-rear direction and the vertical direction may be referred to as a left-right direction or a horizontal direction.

Figure 2:
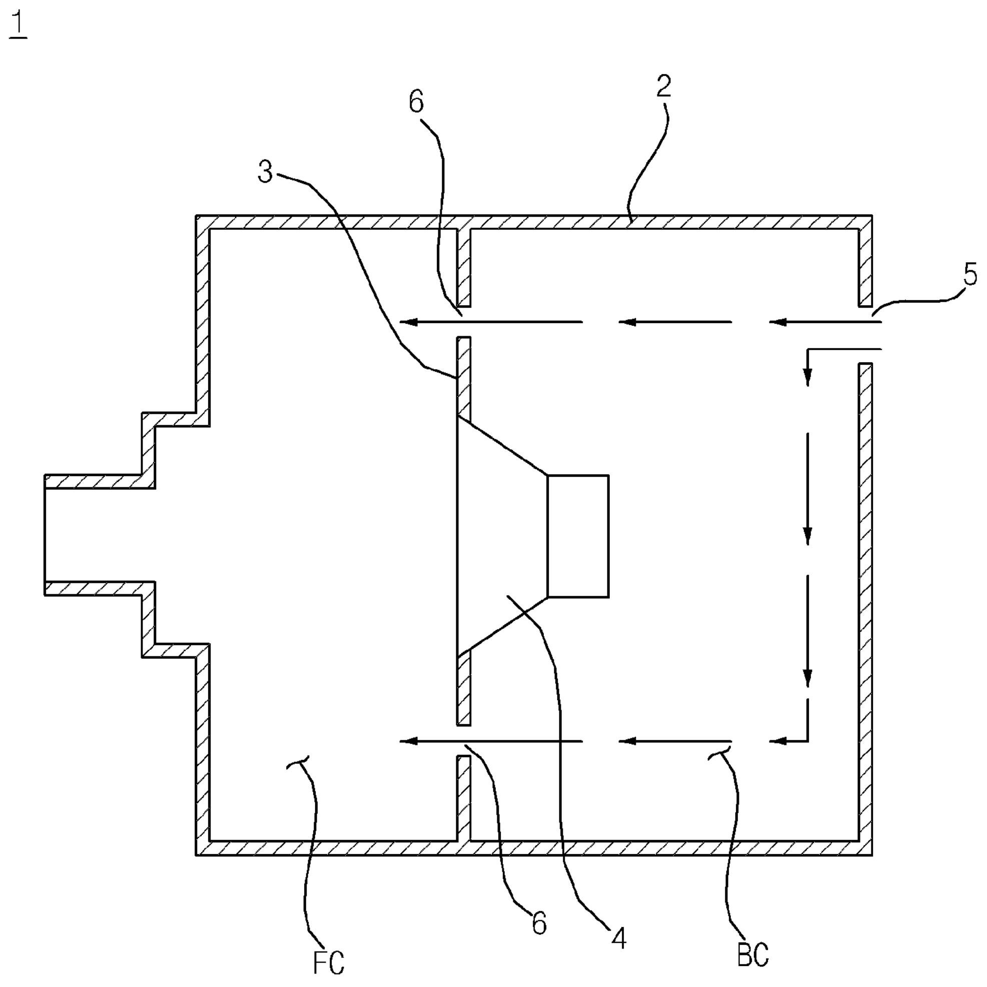

Referring to FIG. 2, the sound device 1 may include a housing 2 having a front chamber FC and a back chamber BC. The front chamber FC and the back chamber BC may be partitioned by a partition wall 3, and a transducer 4 may be located in the back chamber BC. The back chamber BC may communicate with the outside through a first hole 5, and external noise may flow into the back chamber BC. An external sound flowed into the back chamber BC may flow into the front chamber FC through a second hole 6 formed in the partition wall 3, and may be received in a microphone located in the front chamber FC. The sound device 1 of FIG. 2 has a structure in which external sound flows into the front chamber FC through the back chamber BC, and a structure in which the front chamber FC and the back chamber BC share a noise inflow path. Due to the characteristics of the sound device 1 being worn by user's ear, there may be a case in which the first hole 5 is covered by the user's ear. In this case, an external sound may not be accurately received, and noise canceling performance may be deteriorated.

Figure 3:
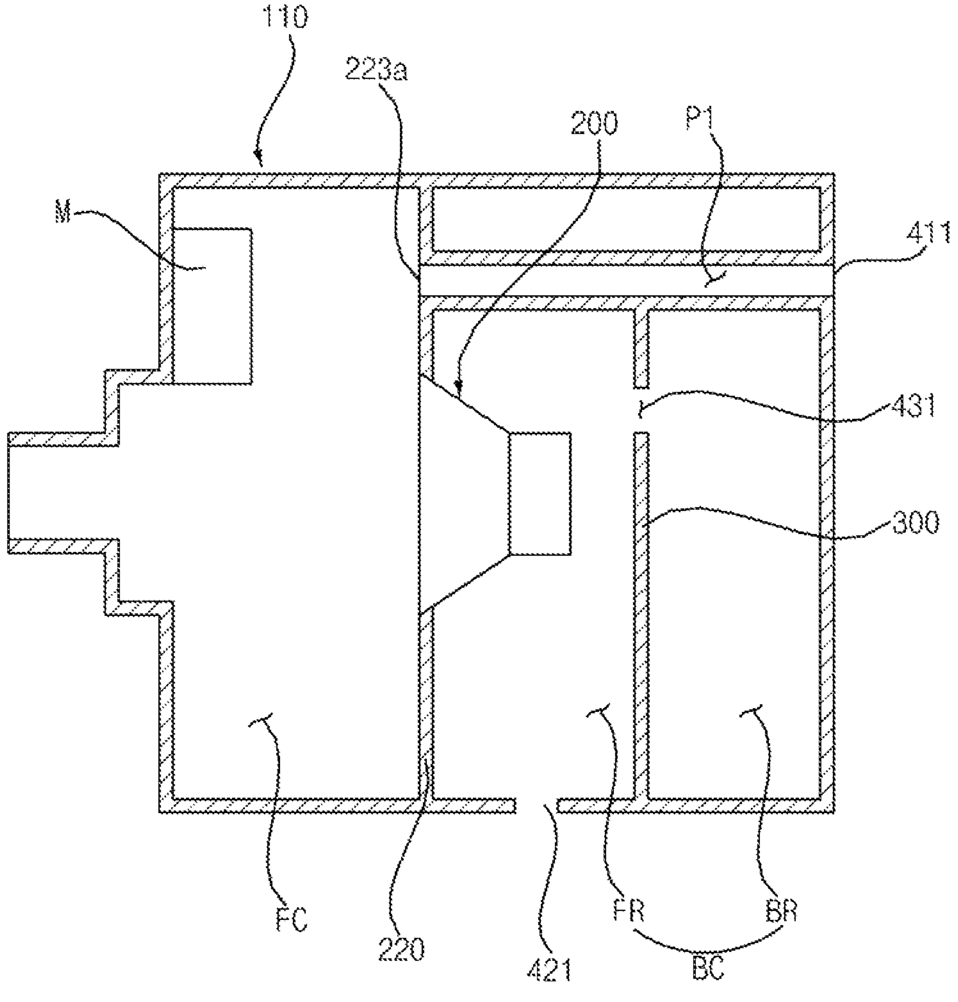

Referring to FIG. 3, an inner space may be formed in the bottom cover 110. The bottom cover 110 may include a front chamber FC and a back chamber BC. The front chamber FC and the back chamber BC may be located in the inner space of the bottom cover 110. The front chamber FC and the back chamber BC may be partitioned by a transducer 200. The front chamber FC and the back chamber BC may be partitioned by a partition wall 220 of the transducer 200. The front chamber FC and the back chamber BC may be partitioned by the transducer 200 and the partition wall 220. The front chamber FC may be located in the forward direction of the transducer 200, and the back chamber BC may be located in the rearward direction of the transducer 200. The front chamber FC and the back chamber BC may not communicate with each other.

The back chamber BC may be partitioned into a front room FR and a back room BR. The front room FR and the back room BR may be partitioned by a bracket 300. The front room FR may be located in the forward direction of the bracket 300, and the back room BR may be located in the rearward direction of the bracket 300. The front room FR may be located closer to the front chamber FC than the back room BR. The front room FR may be a space in which the transducer 200 is located. The back room BR may be a space in which a circuit portion is located. For example, a power supply 520 may be disposed in the back room BR. The power supply 520 may include a battery.

An air hole 411 may be formed from the outer surface of the housing 100 toward the outside of the back chamber BC. The air hole 411 may be formed from the outer surface of the bottom cover 110 toward the outside of the back chamber BC. The air hole 411 may not communicate with the back chamber BC, and may communicate with the front chamber FC. The air hole 411 may communicate with the inner space of the housing 100 that is independent of the back chamber BC. The air hole 411 may be located adjacent to the back chamber BC. The air hole 411 may penetrate the bottom cover 110. The air hole 411 may be exposed to the outside (refer to FIG. 1). The air passed through the air hole 411 may flow into the front chamber FC through the inner space of the housing 100 independent of the back chamber BC. The inner space of the housing 100 independent of the back chamber BC may be provided as a first air path P1 that communicates the air hole 411 and the front chamber FC. The first air path P1 may be located in the back chamber BC. Alternatively, the first air path P1 may not be located in the back chamber BC and may communicate with the front chamber FC. Alternatively, the first air path P1 may communicate with the front chamber FC without being located in both the back chamber BC and the front chamber FC.

The first air path P1 may communicate with the air hole 411. The air hole 411 may constitute a portion of the first air path P1. The first air path P1 may communicate with the air hole 411 and the front chamber FC. The first air path P1 may penetrate the bracket 300, and may be connected to a through hole 223*a* of the partition wall 220. The first air path P1 may connect between the air hole 411 and the through hole 223*a*. The first air path P1 may not connect the air hole 411 and the back chamber BC. The front chamber FC may communicate with the air hole 411 through the first air path P1, and may communicate with the outside through the air hole 411. External sound may flow into the front chamber FC through the air hole 411 and the first air path P1 without passing through the back chamber BC.

A vent hole 421 may penetrate the bottom cover 110. The front room FR may communicate with the outside through the vent hole 421. The sound flowed into the front room FR through the hole 421 may pass through the transducer 200 to move to the front chamber FC, and may be received by the inner microphone M.

An inner hole 431 may penetrate the bracket 300. The inner hole 431 may serve to expand the front room FR. The inner hole 431 may extend the front room FR to the back room BR. Thus, the performance of the transducer 200 may be improved, and the sound performance of the sound device 10 may be improved.

Figure 15:
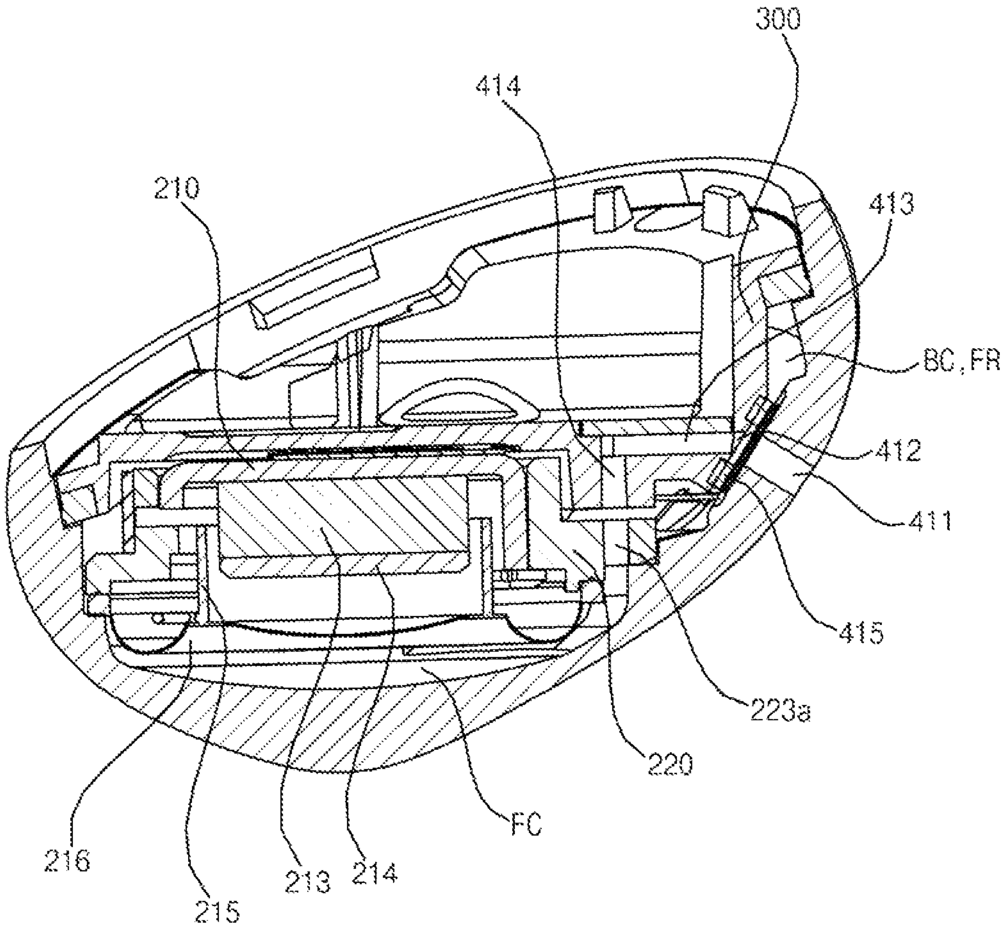

An inner microphone M may be disposed in the front chamber FC (refer to FIG. 15). The inner microphone M may receive a sound flowed into the inner space of the bottom cover 110. The inner microphone M may receive a sound introduced into the front chamber FC. For example, the inner microphone M may receive a sound output from the transducer 200. For example, the inner microphone M may receive noise. For example, the inner microphone M may be a sound-collecting microphone for an active noise canceling (ANC). The sound device 10 may perform feedback-type noise canceling by using the inner microphone M. Alternatively, the sound device 10 may perform hybrid-type noise canceling through the outer microphone and the inner microphone M.

The transducer 200 may be located between the front chamber FC and the back chamber BC. The transducer 200 may be located between the front chamber FC and the front room FR. The transducer 200 may output a sound.

A controller of the sound device 10 may detect a noise among sounds received from the microphone M. The controller of the sound device 10 may generate a noise removal signal having an anti-phase of the noise. The transducer 200 may output a sound of a wave having an anti-phase of the noise according to the noise removal signal. Thus, an active noise canceling function may be performed.

The transducer 200 may output a sound according to a replay signal of the controller, and may output a sound capable of canceling an external sound (e.g. noise) received through the microphone M. Accordingly, sound replay and noise canceling may be simultaneously performed. Alternatively, noise canceling may be performed alone. External sound may flow into the inner space of the housing 100 through the air hole 411 and/or the vent hole 421. The air passed through the air hole 411 may flow into the front chamber FC through a space P1 (first air path) independent of the back chamber BC, and may be received by the microphone M. The air passed through the vent hole 421 may be received by the microphone M by passing through the transducer 200 located in the front room FR. The transducer 200 may output a sound capable of canceling an external sound received from the microphone M.

The sound output from the transducer 200 may be output in the forward direction of the transducer 200, and may be output to the outside of the housing 100 through the nozzle 130. In this case, some of the sound output from the transducer 200 may be output to the outside of the housing 100 through the air hole 411 and/or the vent hole 421.

Figure 4:
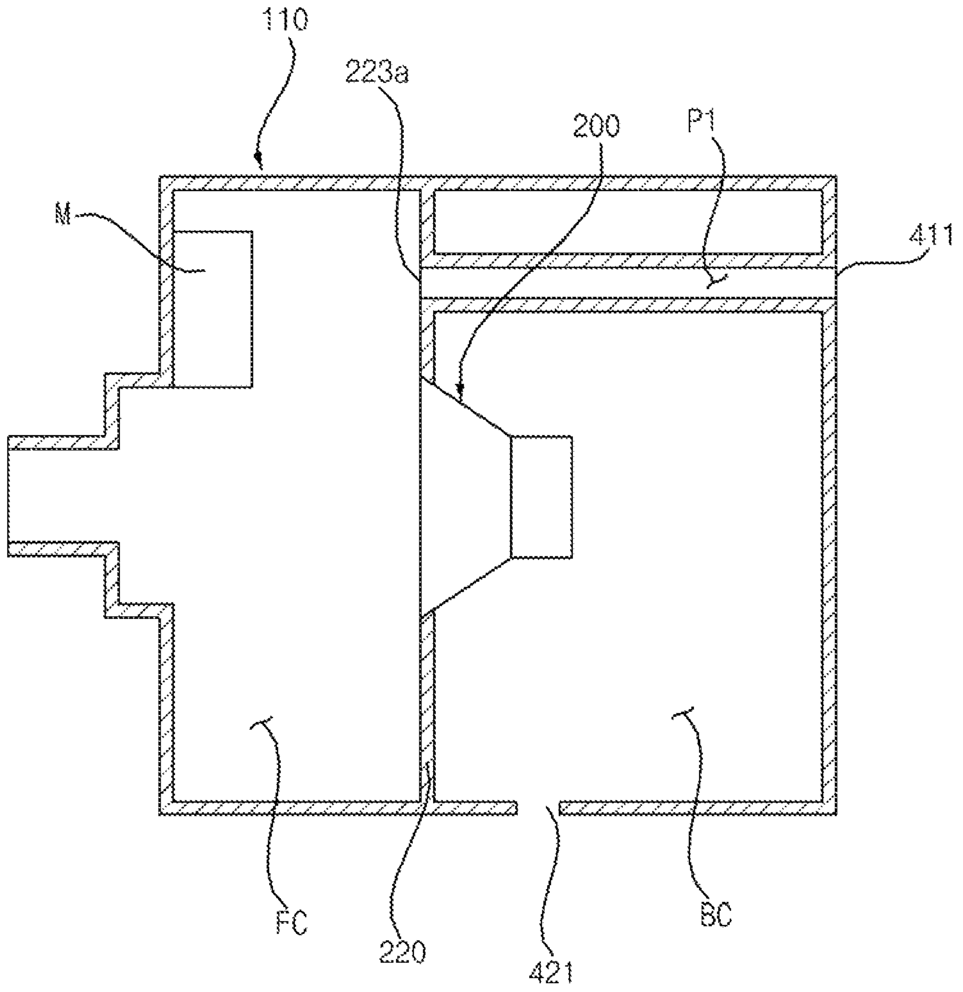

Referring to FIG. 4, the inner space of the bottom cover 110 may be partitioned into a front chamber FC and a back chamber BC based on the transducer 200. The partition wall 220 may be located between the front chamber FC and the back chamber BC. The air hole 411 may be formed adjacent to the back chamber BC, and the first air path P1 communicating with the air hole 411 may communicate with the front chamber FC through the through hole 223*a* of the partition wall 220. The back chamber BC may communicate with the vent hole 421 penetrating the bottom cover 110. A circuit portion may be located in the back chamber BC. The inner microphone M may be located in the front chamber FC. External sound may flow into the front chamber FC through the air hole 411, and may be received by the microphone M. External sound may flow into the back chamber BC through the vent hole 421, may flow into the front chamber FC through a vibrating member of the transducer 200, and may be received by the microphone M. The inner microphone M may receive the external sound flowed into the front chamber FC.

The transducer 200 may output a sound capable of canceling an external sound received from the inner microphone M. The sound output from the transducer 200 may be output in the forward direction of the transducer 200, and may be output to the outside of the housing 100 through the nozzle 130. In this case, some of the sound output from the transducer 200 may be output to the outside of the housing 100 through the air hole 411 and/or the vent hole 421.

Figure 5:
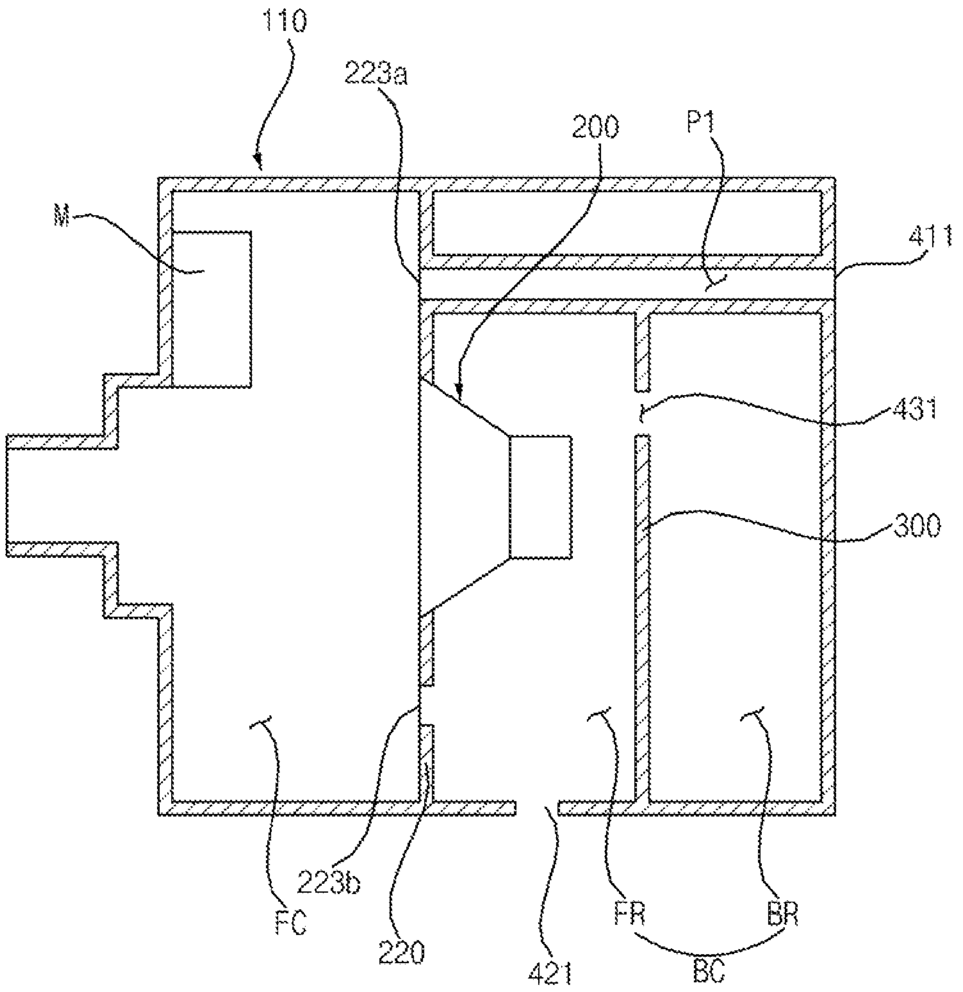

Referring to FIG. 5, the inner space of the bottom cover 100 may be partitioned into a front chamber FC and a back chamber BC. The transducer 200 may be located between the front chamber FC and the back chamber BC. The partition wall 220 may partition the front chamber FC and the back chamber BC. The back chamber BC may be partitioned into a front room FR and a back room BR by the bracket 300. The front room FR may be a space in which the transducer 200 is located, and the back room BR may be a space in which the circuit portion is located. An inner hole 431 penetrating the bracket 300 may be formed in the bracket 300, thereby extending the front room FR to the back room BC. The air hole 411 may be formed adjacent to the back chamber BC. The air hole 411 may communicate with the first air path P1, and the first air path P1 may communicate with the front chamber FC. The air hole 411 and the first air path P1 may not communicate with the back chamber BC. The air hole 411 may be formed by penetrating the bottom cover 110, and may communicate with the front room FR.

In this arrangement, the through hole 223*a* may be referred to as a first through hole 223*a* formed in the partition wall 220. A second through hole 223*b* may also be formed in the partition wall 220. The first through hole 223*a* may communicate the first air path P1 and the front chamber FC. The second through hole 223*b* may communicate the front chamber FC and the back chamber BC.

The inner microphone M may be located in the front chamber FC. The inner microphone M may receive a sound flowed into the front chamber FC. External sound may flow into the front chamber FC through the air hole 411. The external sound may flow into the back chamber BC through the vent hole 421, and may flow into the front chamber FC after passing through the vibrating member of the transducer 200. External sound may flow into the back chamber BC through the vent hole 421, and may flow into the front chamber BC through the second through hole 223*b*. The transducer 200 may output a sound capable of canceling an external sound received from the inner microphone M. The sound output from the transducer 200 may be output in the forward direction of the transducer 200, and may be output to the outside of the housing 100 through the nozzle 130. In this case, some of the sound output from the transducer 200 may be output to the outside of the housing 100 through the air hole 411 and/or the vent hole 421.

Figure 6:
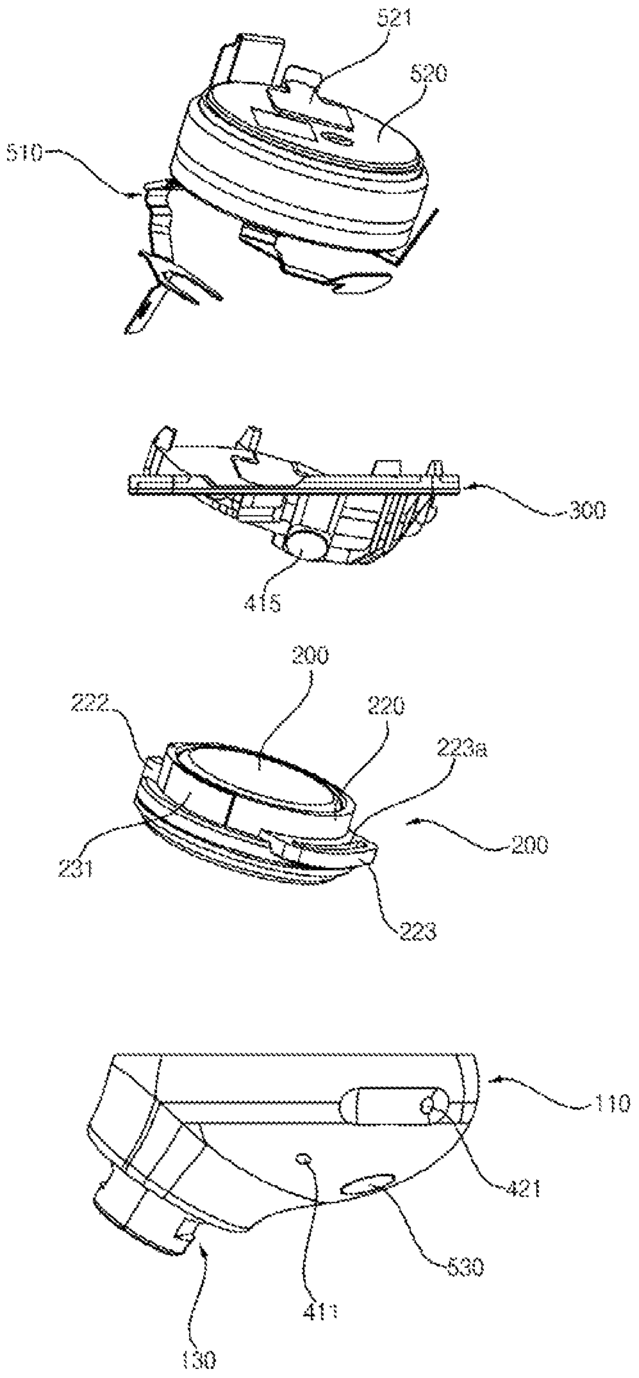

Referring to FIG. 6, the housing 100 may include a bottom cover 110 and a top cover 120 (refer to FIG. 1). The inner space of the housing 100 may be formed by a combination of the bottom cover 110 and the top cover 120. The transducer 200, the bracket 300, the power supply 520, and a substrate 510 may be accommodated in the inner space of the housing 100. For example, inside the bottom cover 110, the transducer 200, the bracket 300, and the power supply 520 may be sequentially disposed toward a rearward direction from a forward direction.

The tap 521, 522 may electrically connect the substrate 510 and the power supply 520. The tap 521, 522 may include a first tap 521 disposed on a top surface of the power supply 521 and a second tap 522 disposed on a bottom surface of the power supply 521. The first tab 521 may be electrically connected by contact with the substrate 510. The second tab 522 may be electrically connected by contact with the substrate 510. The first tab 521 and the second tab 522 may be electrically connected through the substrate 510 each other. The first tab 521 and the second tab 522 may have the same shape. The first tab 521 and the second tab 522 may face each other with respect to the power supply 520. The second tab 522 may be disposed between the power supply 520 and the bracket 300. The second tab 522 may be disposed at a tab coupling portion 313 formed on a first part 310 of the bracket (refer to FIG. 9).

Figure 7:
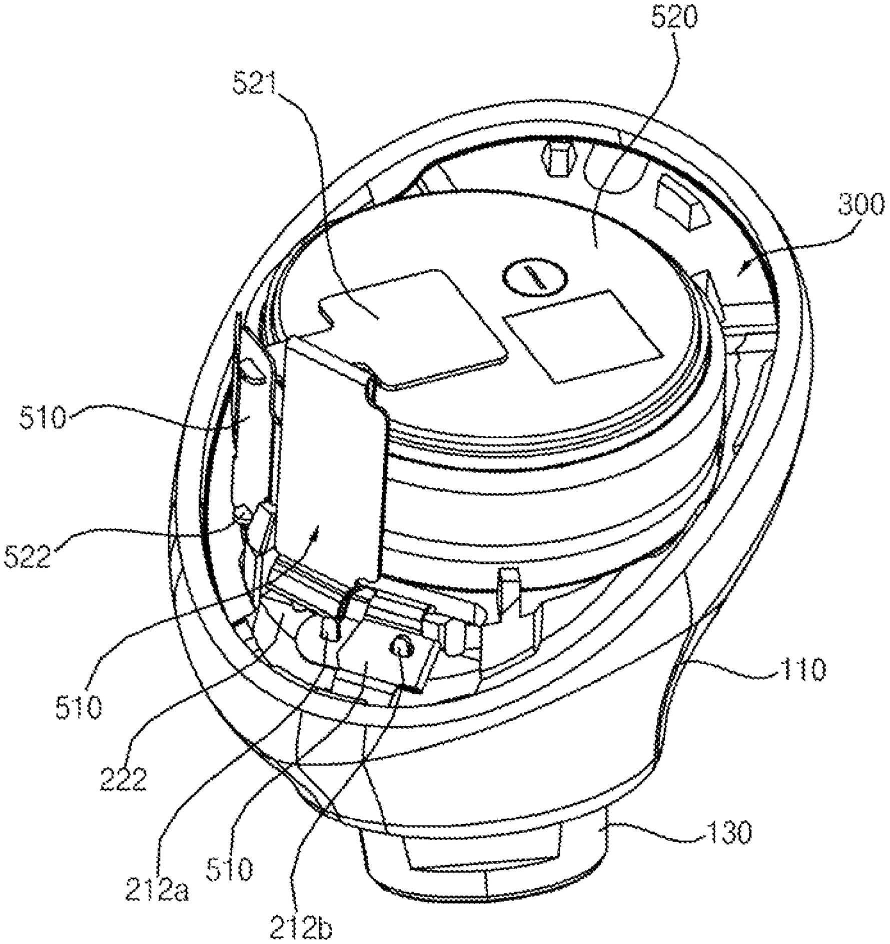

Referring to FIGS. 6 and 7, the bottom cover 110 may have a tubular shape in which the front and rear surfaces are opened. The nozzle 130 may be coupled to the front surface of the bottom cover 110, and the top cover 120 (refer to FIG. 1) may be coupled to the rear surface of the bottom cover 110. The rear surface of the bottom cover 110 may be inclined. An opening formed in the rear surface of the bottom cover 110 may have an elliptical shape. A linear distance connecting the front and rear surfaces of the bottom cover 110 may increase as it progresses from left to right in FIG. 6.

Figure 8:
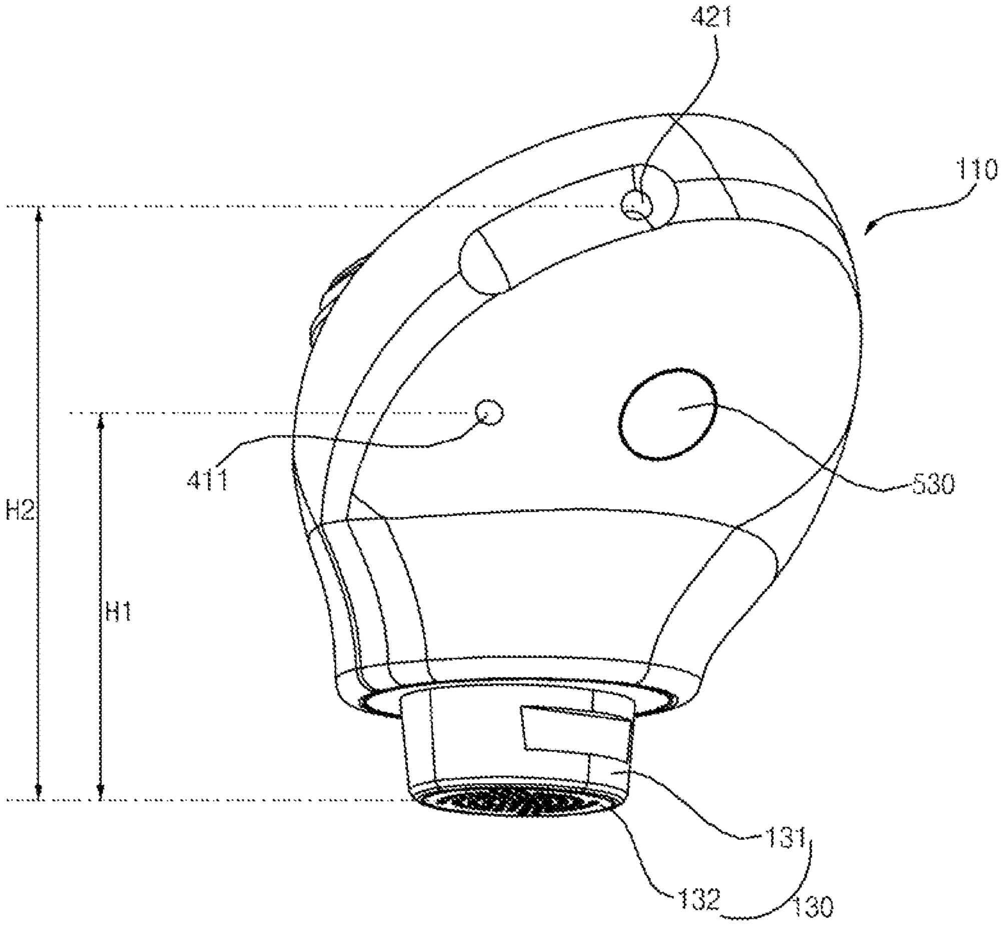

Referring to FIGS. 6 and 8, a nozzle tip 131 may be coupled to the front surface of the bottom cover 110. The nozzle tip 131 may have a circular cross-section. The nozzle tip 131 may be formed in a cylindrical shape. A lower surface of the nozzle tip 131 may be opened. Sound may be output to the outside of the housing 100 through the opened lower surface of the nozzle tip 131. The opened lower surface of the nozzle tip 131 may be defined as a speaker hole. A nozzle plate 132 may be coupled to the speaker hole of the nozzle tip 131. A plurality of holes may be formed in the nozzle plate 132. The nozzle 130 may be inserted into user's ear when a user wears the sound device 10. The nozzle 130 may be a path through which the sound generated in the transducer 200 moves. The sound may be output to the outside of the sound device 10 through the plurality of holes of the nozzle plate 132. The nozzle tip 131 may have a diameter smaller than a diameter of an opening formed on the rear surface of the bottom cover 110. Thus, a passive noise canceling (PNC) function may be provided.

Figure 16:
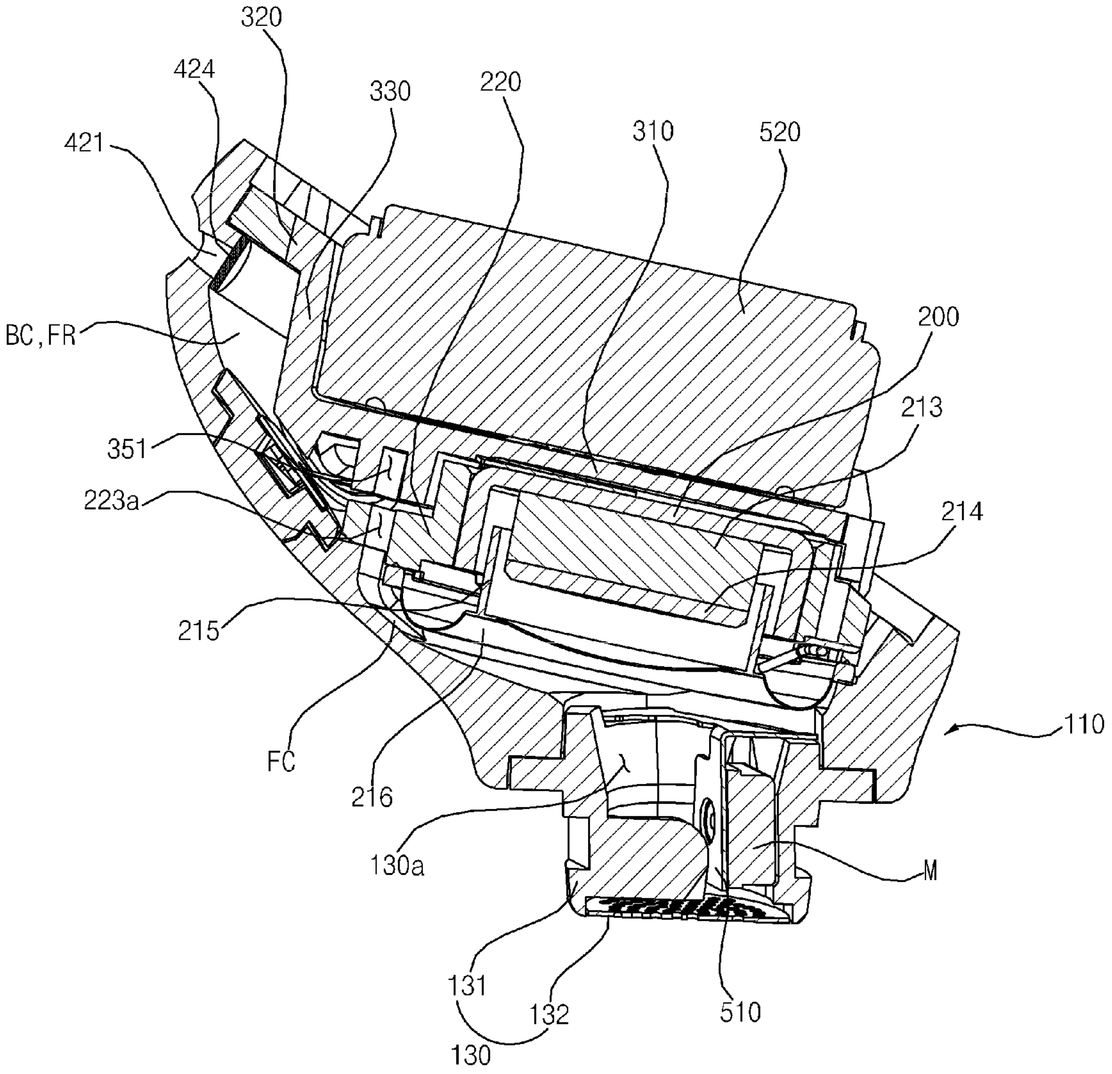

Referring to FIG. 16, the nozzle tip 131 may have a tubular shape in which the upper and lower surfaces are opened. A nozzle plate 132 may be coupled to the lower surface of the nozzle tip 131, and the upper surface of the nozzle tip 131 may be coupled to the bottom cover 110. An inner space 130*a* may be formed in the nozzle 130, and may communicate with the inner space of the bottom cover 110. The inner space 130*a* of the nozzle 130 may form a portion of the front chamber FC. The inner space 130*a* of the nozzle 130 may communicate with the front chamber FC of the bottom cover 110. An inner microphone M may be installed in the inner space 130*a* of the nozzle 130. The inner microphone M may be mounted in the substrate 510. The inner microphone M may be electrically connected to the power supply 520 through the substrate 510, and may receive power.

Referring to FIG. 8, an air hole 411 and a vent hole 421 may be formed in the bottom cover 110. The air hole 411 may be located in any one of a first position located at a first height H1 from the nozzle plate 132 and a second position higher than the first height H2 from the nozzle plate 132, and the vent hole 421 may be located in the other one of the first position and the second position. For example, the air hole 411 may be located at the first height H1, and the vent hole 421 may be located at the second height H2. As another example, the air hole 411 may be located at the second height H1, and the vent hole 421 may be located at the second height H2. The first height H1 may be a height that is not covered by user's ear, when a user wears the sound device 10. Thus, an external sound may be more accurately received through the air hole 411, and noise canceling performance may be improved. The vent hole 421 may be located closer to the top cover 120 than the air hole 411. In this case, when a user wears the sound device 10, at least one of the air hole 411 and the vent hole 421 may not be covered by user's ear. Thus, external sound may be more accurately received, and noise canceling performance may be improved. The housing 100 may be formed in a conical shape (refer to FIGS. 8 and 16). The bottom cover 110 may be formed in a conical shape. The bottom cover 110 may have a narrower diameter as it progresses from the nozzle 130 to the top cover 120. The lower surface to which the nozzle 130 of the bottom cover 110 is coupled may be formed as a flat surface, and the upper surface to which the top cover 120 is coupled may be formed to be inclined. The bottom cover 110 may include a first area having a first diameter and a second area having a diameter larger than the first diameter. The second area may be located at a position from the nozzle 130 higher than the first area. The air hole 411 and the vent hole 421 may be located in the second area. The first position and the second position may be located in the second area. Accordingly, when a user wears the sound device 10, the air hole 411 and the vent hole 421 may not be covered by user's ear. Alternatively, when the user wears the sound device 10, at least one of the air hole 411 and the vent hole 421 may not be covered by user's ear. Thus, active noise canceling performance may be improved.

Referring to FIGS. 7, 9, 10, and 11, the bracket 300 may be located in the bottom cover 110. The bracket 300 may partition the back chamber BC into a front room FR and a back room BR. The bracket 300 may include a first portion 310, a second portion 320 located in the rearward direction of the first portion 310, and a third portion 330 connecting the first portion 310 and the second portion 320. The first to third portions 310, 320, and 330 may be formed as one body. The first portion 310 and the second portion 320 may form a step difference. The third portion 330 may extend in the rearward direction from an outer edge area of the first portion 310. The second portion 320 may extend outwardly from the third portion 330. The second portion 320 and the first portion 310 may not overlap in the vertical direction.

The bracket 300 may include an opening portion 340. The opening portion 340 may be formed by cutting off at least a portion of the first portion 310. At least a portion of the substrate 510 may be located in the opening portion 340. At least a portion of the transducer 200 may be exposed to the back room BR through the opening portion 340. Through the opening portion 340, a terminal portion 222 of the transducer 200 may be exposed to the back room BR. The opening portion 340 may be coupled to the terminal portion 222 of the transducer 200. The opening portion 340 may be sealed by the terminal portion 222 of the transducer 200.

A surface of the first portion 310 of the bracket 300 facing the back room BR may be referred to as a first surface, and a surface of the first portion 310 of the bracket 300 that faces the front room FR and is located opposite to the first surface may be referred to as a second surface.

The back room BR may be a space in which a circuit portion is disposed. For example, the circuit portion may include a power supply 520 or a controller. The power supply 520 may be disposed on the first surface of the first portion 310. A tab coupling portion 313 in which the second tab 522 electrically connecting the power supply 520 and the substrate 510 is disposed may be formed in the first portion 310 (refer to FIG. 7). The tab coupling portion 313 may be a groove recessed from the first surface of the first portion 310. The tab coupling portion 313 may be formed in a shape corresponding to the second tab 522 (refer to FIG. 7).

A first air path P1 may be formed in the bracket 300. The first air path P1 may be formed by penetrating the bracket 300. One end of the first air path P1 may communicate with the air hole 411, and the other end of the first air path P1 may communicate with the front chamber FC. One end of the first air path P1 may communicate with the air hole 411, and the other end of the first air path P1 may communicate with the through hole 223*a* of a first protrusion 223 (refer to FIG. 6). The first air path P1 may be a passage through which an external sound introduced into the air hole 411 moves. The external sound introduced through the air hole 411 may be introduced into the front chamber FC of the bottom cover 110 through the first air path P1. The first air path P1 may communicate with the front chamber FC, and may not communicate with the back chamber BC. The first air path P1 may form an independent air path with respect to the back chamber BC.

The first air path P1 may include a first hole 412, at least a portion of which is opposed to the air hole 411, a second hole 414 formed by penetrating the first portion 310 of the bracket 300 in the front-rear direction, and a groove 413 connecting the first hole 412 and the second hole 414. The first hole 412 may be formed in an edge area of the first portion 310. The first hole 412 may be formed in a connection portion between the first portion 310 and the third portion 330. The first hole 412 may be formed by penetrating the bracket 300.

The groove 413 may extend from the first hole 412. The groove 413 may be recessed from the first surface of the first portion 310. The groove 413 may be formed in a recess portion 311. The groove 413 may extend in a first direction from the first hole 412. In this case, the first direction may be a direction toward the inside of the first portion 310 from the outer edge area of the first portion 310. The groove 413 may be opened toward the back room BR. The groove 413 may be covered by a cover member 312 (refer to FIG. 11).

The second hole 414 may be formed by penetrating the first portion 310 in the front-rear direction. The second hole 414 may be formed by penetrating a recess portion 311 in the front-rear direction. The second hole 414 may be formed in a direction perpendicular to the extending direction of the groove 413. The second hole 414 may be connected to the front chamber FC. One end of the second hole 414 may be connected to the groove 413, and the other end of the second hole 414 may be connected to the front chamber FC. One end of the second hole 414 may be connected to the groove 413, and the other end of the second hole 414 may be connected to the through hole 223*a* of the first protrusion 223. The groove 413 and the second hole 414 may be covered by the cover member 312 (refer to FIG. 11).

A second protrusion 350 (refer to FIG. 11) may be formed on a surface of the bracket 300 facing the front room FR. The second protrusion 350 may protrude from at least a portion of the bracket 300 in a direction toward the front chamber FC. The second protrusion 350 may protrude forward from a second surface of the first portion 310 of the bracket 300. The second protrusion 350 may face the first protrusion 223 (refer to FIG. 14) of the partition wall 220. The second protrusion 350 may contact the first protrusion 223. A groove 351 may be formed in the second protrusion 350. The groove 351 of the second protrusion 350 may be connected to the through hole 223*a* of the first protrusion 223. The second hole 414 may be formed in the groove 351. The second hole 414 may communicate with the front chamber FC through the through hole 223*a*.

A second air path P2 may be formed in the bracket 300. The second air path P2 may provide a sound passage between the front room FR and the back room BR. The second air path P2 may include an inner hole 431. The inner hole 431 may be spaced apart from the first air path P1. The inner hole 431 may be formed by penetrating the first portion 310 of the bracket 300. The inner hole 431 may communicate the front room FR and the back room BR. The inner hole 431 may expand a space (front room FR) in which the transducer 200 is located. The inner hole 431 may improve a sound by adjusting a noise attenuation slope. The inner hole 431 may improve a sound by adjusting the flatness level of a middle band.

The inner hole 431 may be covered by the power supply 520 located in the bracket 300. Accordingly, the second air path P2 may include a first inner groove 432 and a second inner groove 433 that are formed in the bracket 300 and connected to the inner hole 431. The first inner groove 432 may be connected to the inner hole 431. The first inner groove 432 may be opened to the back room BR. The first inner groove 432 may be a groove recessed from the first surface of the first portion 310 of the bracket 300. One end of the first inner groove 432 may be connected to the inner hole 431, and the other end of the first inner groove 432 may be connected to the second inner groove 433. The second inner groove 433 may be formed in the third portion 330 of the bracket 300. The second inner groove 433 may extend from the first inner groove 432. The second inner groove 433 may be opened toward the back room BR.

Figure 9:
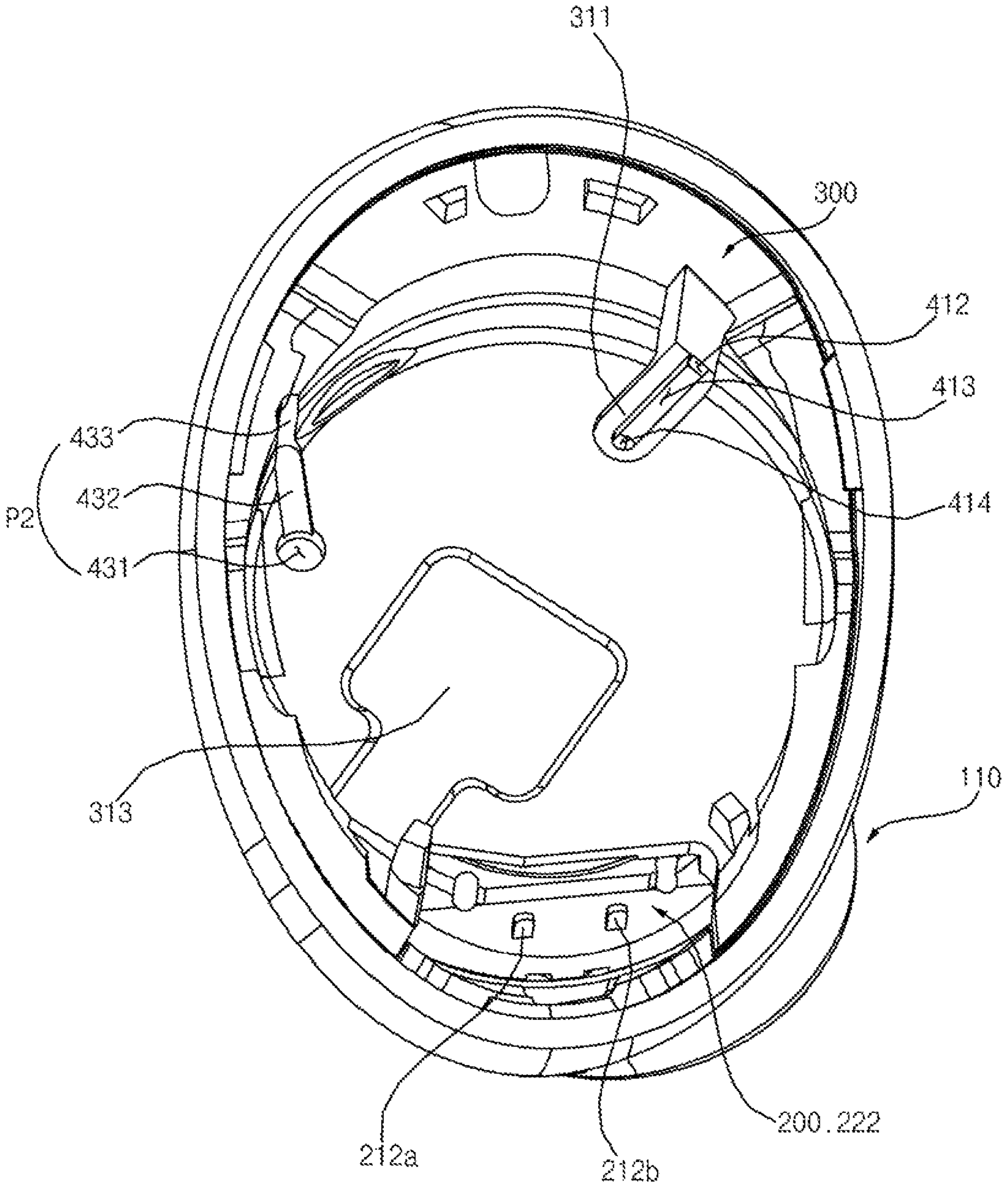
Figure 10:
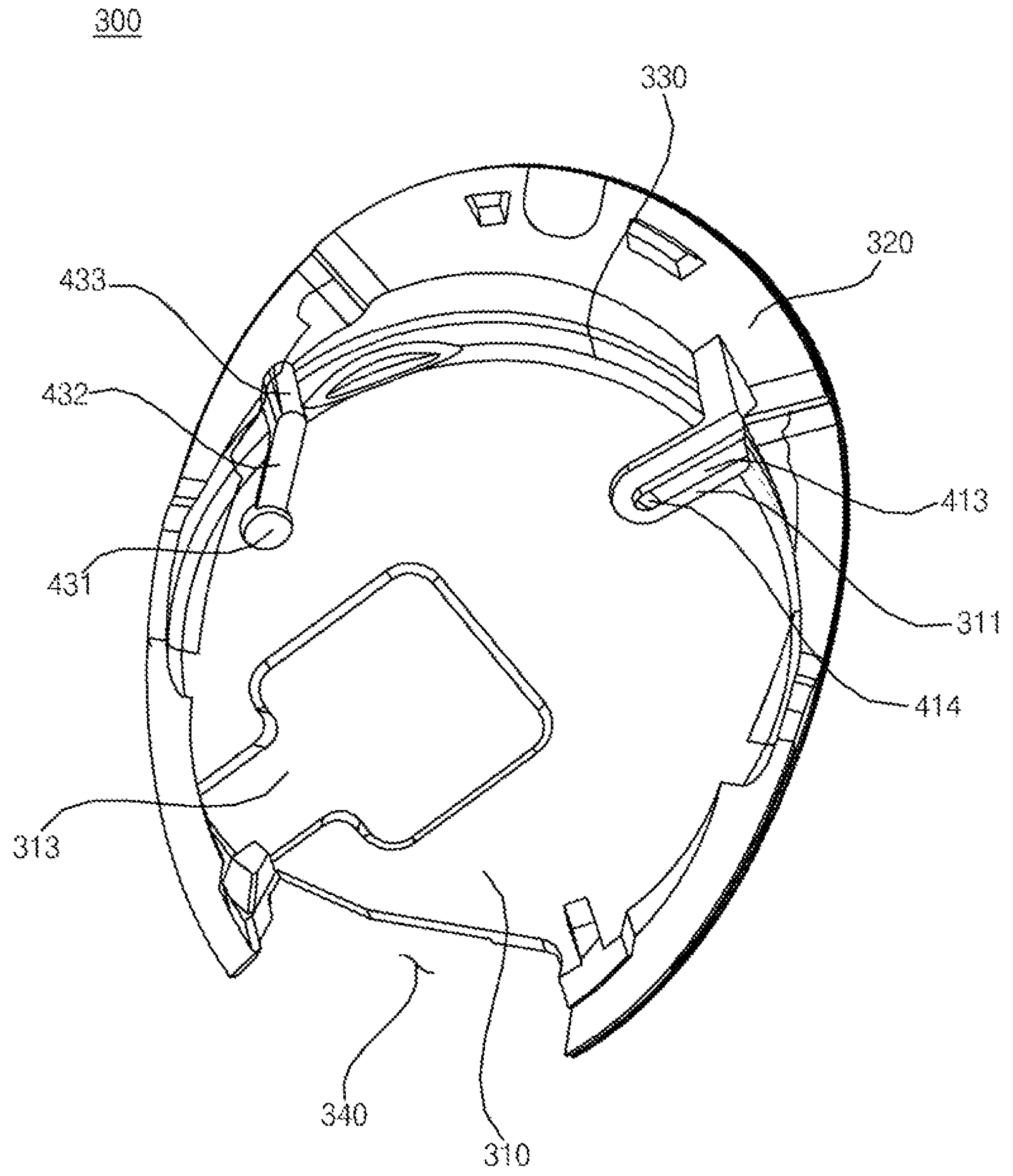
Figure 11:
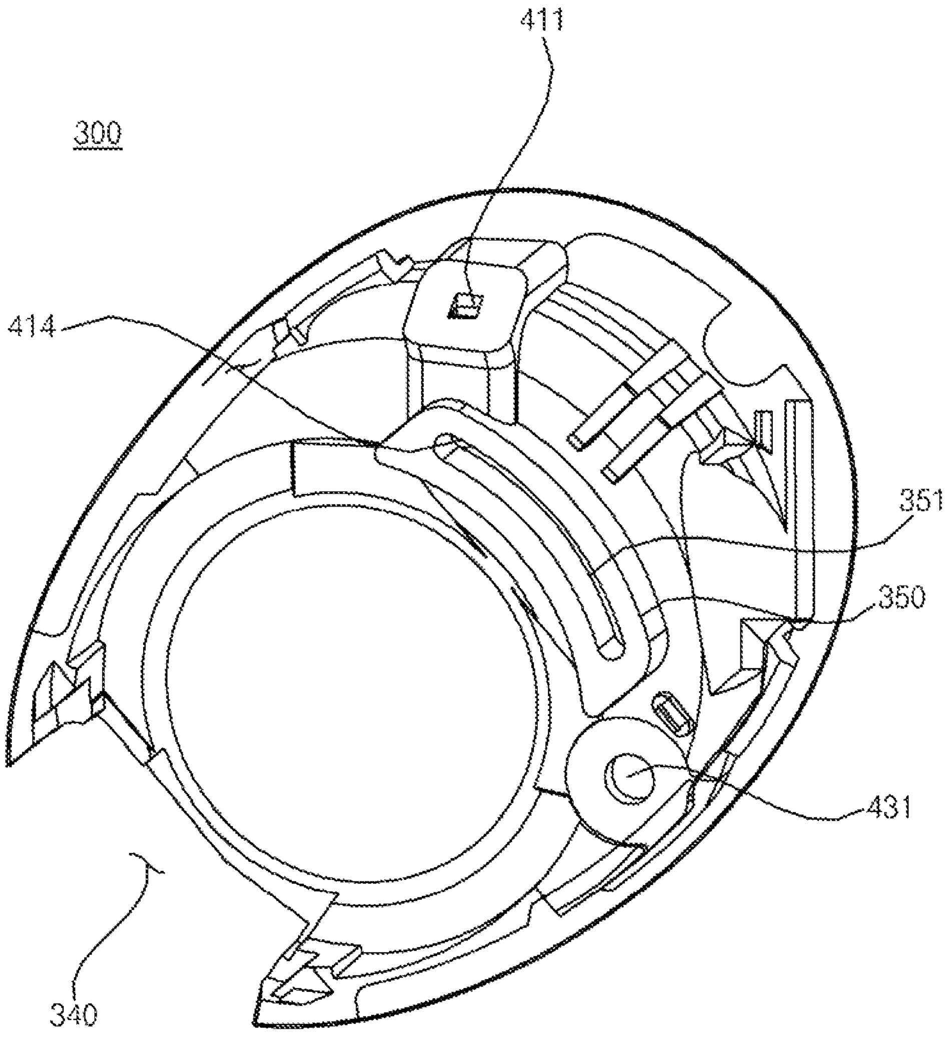
Figure 12:
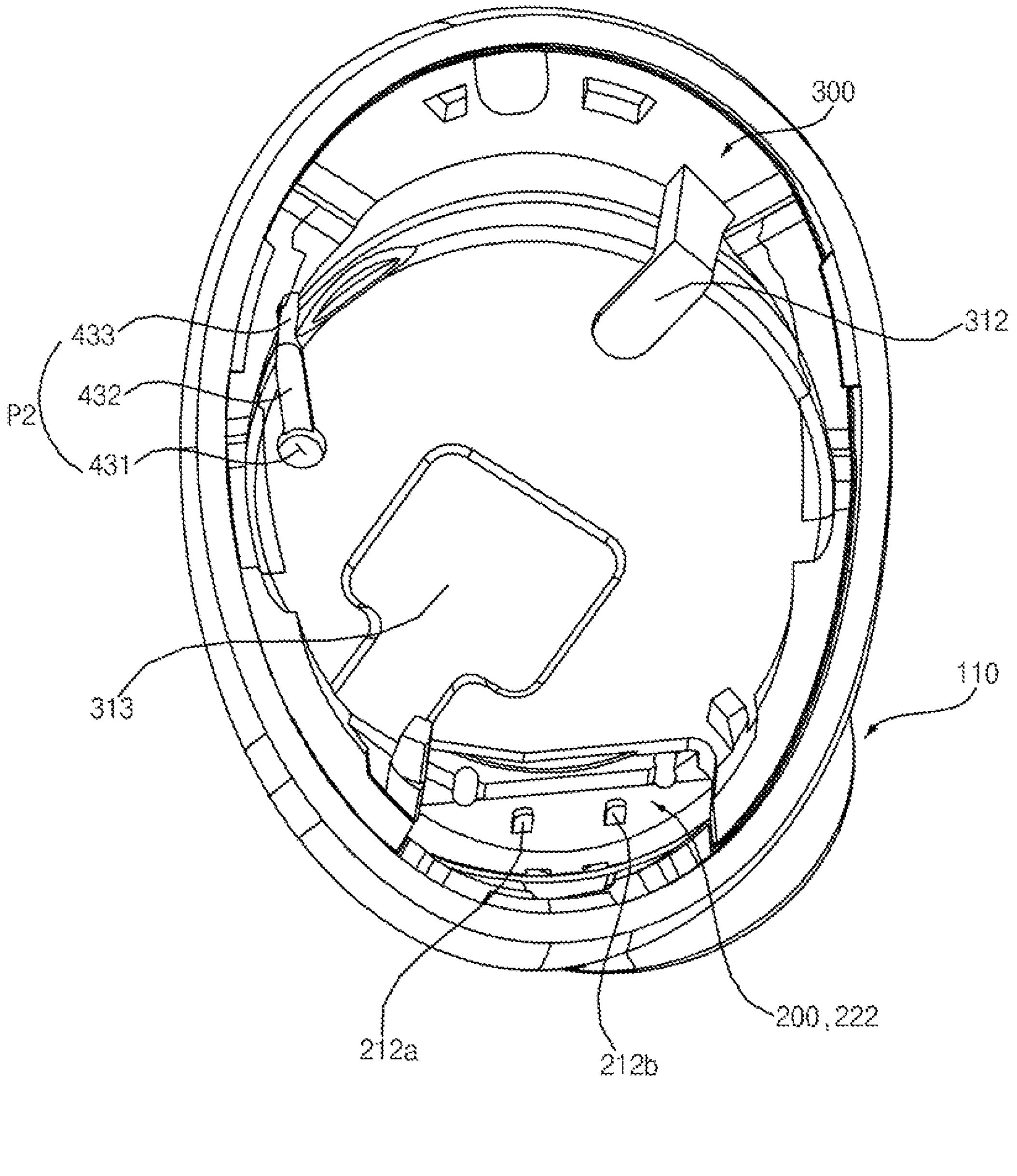

Referring to FIGS. 9 and 12, a recess portion 311 in which at least a portion of the first air path P1 is formed may be formed in the bracket 300. The recess portion 311 may be a groove recessed from the first surface of the first portion 310. The recess portion 311 may be formed with a first depth from the first surface of the first portion 310, and the groove 413 may be recessed from the bottom surface of the recess portion 311. The cover member 312 may be disposed in the recess portion 311 and may cover the first air path P1. Accordingly, the first air path P1 may not communicate with the back room BR. The recess portion 311 may have a shape and size corresponding to the cover member 312. The cover member 312 may be attached to the recess portion 311. The cover member 312 may be coupled to the recess portion 311 by a tape. The tape may attach the cover member 312 to the recess portion 311, and may shield the sound inside the front chamber FC from moving to the back chamber BC.

Referring to FIGS. 8 and 16, the vent hole 421 may be formed by penetrating the bottom cover 110. The vent hole 421 may communicate with the back chamber BC. The vent hole 421 may communicate with the front room FR. The vent hole 421 may be exposed to the outside. The vent hole 421 may extend the front room FR to the outside of the housing 100. Thus, the sound output from the sound device 10 may be improved. The vent hole 421 may be formed in a position lower than a position where the second portion 320 of the bracket 300 is coupled to the bottom cover 110 (refer to FIG. 16). The vent hole 421 may connect the outside and the front room FR. External sound may flow into the front room FR through the vent hole 421, may flow into the front chamber FC by passing through the vibrating member of the transducer 200, and may be received by the inner microphone M. A pipe 422 may be inserted into the vent hole 421 (refer to FIG. 17). The vent hole 421 may adjust the level of middle-band and/or low-band. The pipe 422 may guide an external sound flowing into the second vent hole 421. The pipe 422 may adjust the level of middle-band and/or low-band. Thus, the sound device 10 may output an improved sound.

Figure 13:
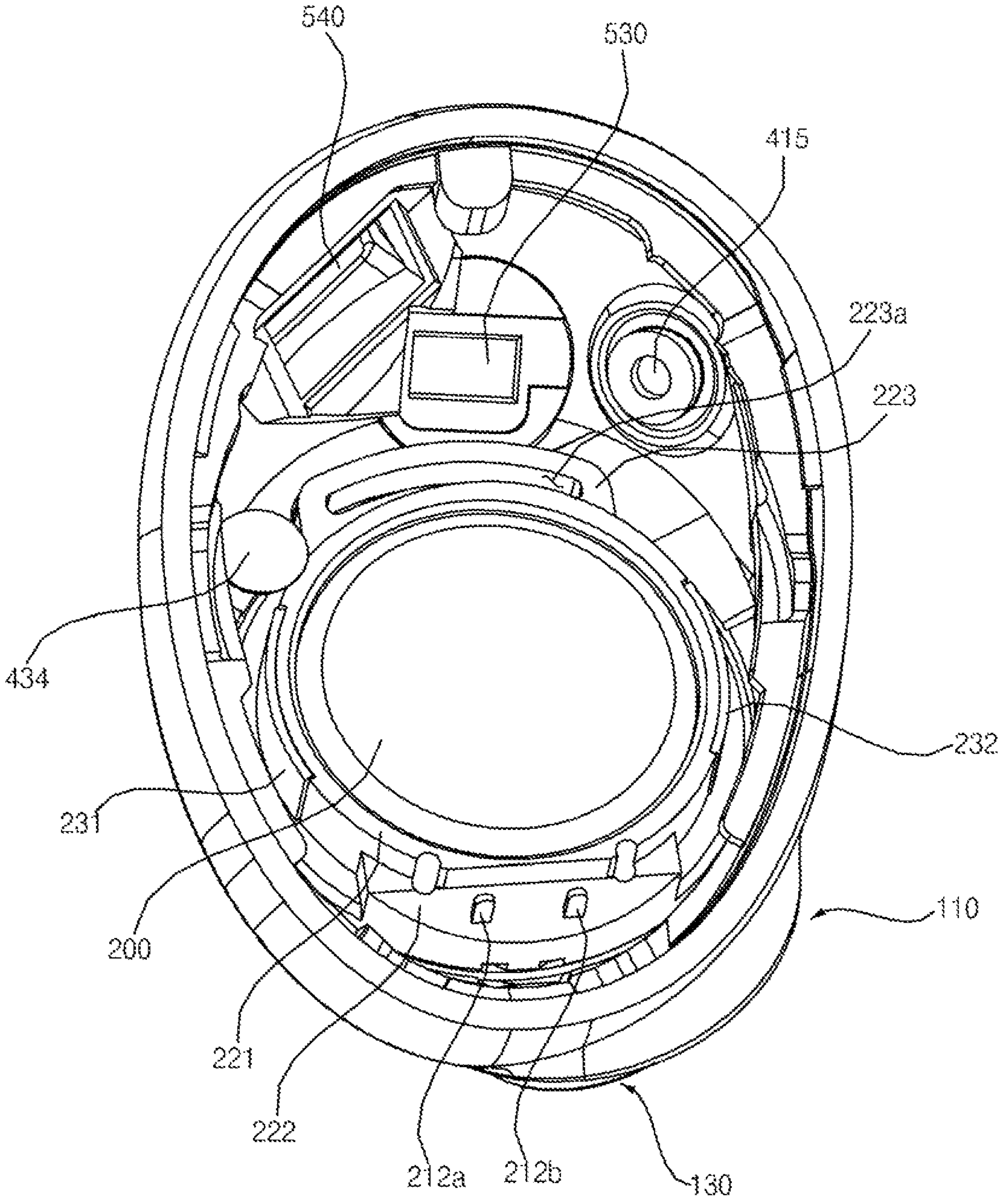

Referring to FIGS. 6 and 13, the transducer 200 may be located in the forward direction of the bracket 300. The transducer 200 may be located between the front chamber FC and the back chamber BC. The transducer 200 may partition the inner space of the bottom cover 110 into a front chamber FC and a back chamber BC. The front chamber FC may be located in the forward direction of the transducer 200. The transducer 200 may be located between the front chamber FC and the bracket 300. The transducer 200 may be located in the front room FR.

The transducer 200 may generate sound. The transducer 200 may convert an electrical signal into a sound signal. The transducer 200 may convert an electrical signal into a sound that a user can hear, and may output the converted sound. The transducer 200 may be referred to as a speaker. The transducer 200 may be referred to as an electronic acoustic transducer. The transducer 200 may be mounted on the substrate 510. The transducer 200 may be electrically connected to the substrate 510 and the power supply 520.

The transducer 200 may output a sound capable of canceling the external sound received by the inner microphone M. The transducer 200 may output a sound capable of canceling external noise received by the inner microphone M. The transducer 200 may output a sound having an anti-phase with respect to the external noise received in the inner microphone M. The transducer 200 may be controlled by a controller. The controller may analyze external noise received from the inner microphone M and/or the outer microphone, and may transmit a noise removal signal having a wave opposite to the analyzed noise to the transducer 200. The transducer 200 may output a sound having a wave opposite to the noise according to the noise removal signal of the controller.

Figure 14:
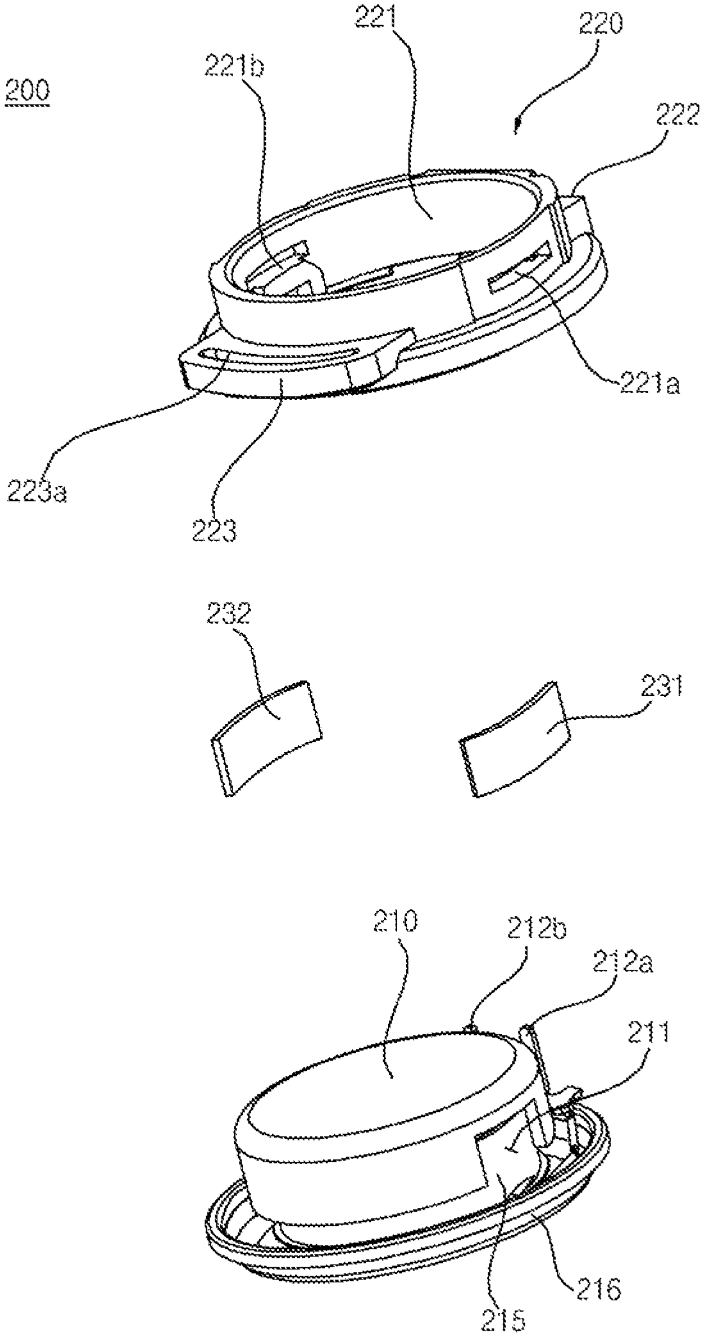

Referring to FIGS. 14 and 15, the transducer 200 may include a yoke 210, a terminal 212*a* (first terminal), 212*b* (second terminal), a magnet 213, a plate 214, a voice coil 215, and a vibrating member 216.

The yoke 210 may be formed in a cylindrical shape having an opened lower portion. The yoke 210 may have an accommodating space for receiving the magnet net 213 and the plate 214 therein. The yoke 210 may receive at least a portion of the voice coil 215 in the accommodating space therein. The yoke 210 may concentrate the magnetic flux on the voice coil 215 and allow the magnetic flux to pass therethrough. The magnet 213 may be accommodated in the inner space of the yoke 210. One surface of the magnet 213 may be coupled to the upper plate of the yoke 210, and the plate 214 may be coupled to the other surface of the magnet 213. At least a portion of the voice coil 215 may be accommodated in the yoke 210. The voice coil 215 may be located between the yoke 210 and the magnet 213. The voice coil 215 may surround the magnet 213. The vibrating member 216 may be coupled to the lower end of the voice coil 215. The vibrating member 216 may be a diaphragm.

The transducer 200 may be an open type transducer 200. The transducer 200 may include an opening 211. The opening 211 may be formed in the yoke 210. The opening 211 may include a plurality of openings 211. For example, the transducer 211 may include a first opening 211 and a second opening facing the first opening 211.

The transducer 200 may include a terminal 212*a*, 212*b* electrically connected to the substrate 510. For example, the terminal 212*a*, 212*b* may include a first terminal 212*a* and a second terminal 212*b*. The first terminal 212*a* and the second terminal 212*b* may be electrically connected. The first terminal 212*a* and the second terminal 212*b* may be electrically connected to the substrate 510. The terminal 212*a*, 212*b* may be electrically connected to the power supply 520 through the substrate 510, and may transmit power to the transducer 200. The terminal 212*a*, 212*b* may be electrically connected to the power supply 520 through the substrate 510, and may transmit a current to the voice coil 215. When a current is applied to the voice coil 215, the voice coil 215 may have magnetism.

The magnetic field generated in the magnet 213 may move to the yoke 210 through the plate 214 coupled to the magnet 213, and move from the yoke 210 to the magnet 213 again to form a closed circuit. The magnetic field moved into a space between the plate 214 and the yoke 210 may move the voice coil 215 according to an interaction with the voice coil 215 to which a current is applied. As the voice coil 215 moves, the vibrating member 216 coupled to the voice coil 215 may move, and the air is vibrated to generate a sound.

The partition wall 220 may be coupled to the transducer 200. The partition wall 220 may be coupled to the circumference of the transducer 200. The partition wall 220 may be coupled to the bottom cover 110, and may support the transducer 200. The partition wall 220 may be disposed between the front chamber FC and the back chamber BC, and may partition the front chamber FC and the back chamber BC. The partition wall 220 may be referred to as a frame 220. The partition wall 220 may be an injection-molded product.

The partition wall 200 may include a main body 221 surrounding the circumference of the transducer 200, a terminal portion 222 which protrudes outwardly from at least a portion of the main body 221, and to which the terminal 212*a*, 212*b* is coupled, and a first protrusion 223 protrudes outwardly from at least a portion of the main body 221 and faces the terminal portion 222.

The main body 221 may be formed in a ring shape in which a hollow is formed, and the transducer 200 may be disposed in the hollow of the main body 221. The main body 221 may include a first damper hole 221*a* and a second damper hole 221*b*. The first damper hole 221*a* may be formed in a position corresponding to the first opening 211 of the transducer 200, and the second damper hole 221*b* may be formed in a position corresponding to the second opening of the transducer 200. The first damper hole 221*a* and the second damper hole 221*b* may be formed symmetrically with respect to a central axis of the main body 221. The first damper hole 221*a* may be formed between the terminal portion 222 and the first protrusion 223. The second damper hole 221*b* may be formed between the terminal portion 222 and the first protrusion 223. The first damper hole 221*a* may have a smaller area than the first opening 211. The second damper hole 221*b* may have a smaller area than the second opening.

A first damper 231 may be disposed in the main body 221. A second damper 232 may be disposed in the main body 221. The first damper 231 may cover the first damper hole 221*a*. The second damper 232 may cover the second damper hole 221*b*. The first damper 231 and the second damper 232 may face each other. The first damper 231 and the second damper 232 may pass through a sound emitted from the transducer 200, and may be formed of a material into which foreign substance is not introduced. For example, the first damper 231 and the second damper 232 may be made of a low-density material. For example, the first damper 231 and the second damper 232 may be applied with a low-density mesh.

The terminal portion 222 may protrude outward from at least a portion of the outer surface of the main body 221. The terminal portion 222 may be disposed between the first damper hole 221*a* and the second damper hole 221*b*. The terminal portion 222 may include a first terminal hole to which the first terminal 212*a* is coupled, and a second terminal hole to which the second terminal 212*b* is coupled (refer to FIG. 12). The first terminal 212*a* and the second terminal 212*b* may penetrate the terminal portion 222, and a portion of the first terminal 212*a* and the second terminal 212*b* may protrude to the upper side of the terminal portion 222 and be exposed. A substrate 510 may be disposed on the upper surface of the terminal portion 222. The first terminal 212*a* and the second terminal 212*b* may be electrically connected to the substrate 510 disposed on the upper surface of the terminal portion 222.

The first protrusion 223 may protrude outward from at least a portion of the outer surface of the main body 221. The first protrusion 223 may be disposed between the first damper hole 221*a* and the second damper hole 221*b*. The first protrusion 223 may face the second protrusion 350 of the bracket 300. The first protrusion 223 may contact the second protrusion 350 of the bracket 300. The first protrusion 223 may include a through hole 223*a* formed by penetrating the first protrusion 223. The through hole 223*a* may be opened to the front chamber FR. The through hole 223*a* may face the groove 351 of the second protrusion 350. The through hole 223*a* may communicate with the groove 351 of the second protrusion 350. The through hole 223*a* may communicate with the second hole 414. The through hole 223*a* may communicate the first air path P1 and the front chamber FC. The through hole 223*a* may form a portion of the first air path P1.

Referring to FIG. 13, the sound device 10 may include a first sensor 530. The first sensor 530 may be disposed in the bottom cover 110. A portion of the first sensor 530 may be exposed to the exterior of the bottom cover 110. The first sensor 530 may be located in the forward direction than the bracket 300. The first sensor 530 may be mounted on the substrate 510. The first sensor 530 may be electrically connected to the power supply 520 through the substrate 510, and may receive power. The first sensor 530 may detect whether the sound device 10 is worn. The first sensor 530 may detect whether the housing 100 is in contact with user's body. For example, the first sensor 530 may be a wear detection sensor. For example, the first sensor 530 may be a proximity sensor.

The sound device 10 may include a second sensor 540. The second sensor 540 may be disposed inside the bottom cover 110. The second sensor 540 may be located adjacent to the first sensor 530. The second sensor 540 may be located in the forward direction than the bracket 300. The second sensor 540 may be mounted on the substrate 510. The second sensor 540 may be electrically connected to the power supply 520 through the substrate 510, and may receive power from the power supply 520. The second sensor 540 may separate user's voice and ambient noise. The second sensor 540 may reduce or remove ambient noise, and may select only user's voice. For example, the second sensor 540 may remove noises such as wind sound and noise introduced into the sound device 10. Thus, clear and accurate call quality can be provided. For example, the second sensor 540 may be provided as a Voice Pickup Unit (VPU).

The sound device 10 may include a substrate 510 (refer to FIG. 5). The substrate 510 may be a printed circuit board (PCB). The substrate 510 may be a flexible printed circuit board (FPCB). The substrate 510 may electrically connect the power supply 520 and components of the sound device 10. For example, the substrate 510 may electrically connect the microphone M, the transducer 200, the first sensor 530, or the second sensor 540 to the power supply 520.

The power supply 520 may be electrically connected to an external charging device through a charging terminal. The power supply 520 may be capable of wired charging or wireless charging. For example, the power supply 520 may be charged by receiving power from an external charging device through a charging terminal. For example, the external charging device may be provided as a charging case capable of receiving the sound device 10.

The sound device 10 according to the present disclosure may include a waterproof structure. The sound device 10 may include a waterproof member. The waterproof member may be formed of a material having waterproof properties. The waterproof member may be formed of a material that does not pass moisture and allows sound and/or air to pass therethrough. The waterproof member may include a material having an IPX waterproof rating. For example, the waterproof member may be formed of a material having a waterproof rating of IPX4 to IPX7. For example, the waterproof member may be provided as a membrane.

The sound device 10 may include a first waterproof member 415 installed in the first air path P1 (refer to FIGS. 13 and 15). The first waterproof member 415 may be disposed in the air hole 411. The first waterproof member 415 may be disposed in the first hole 412. The first waterproof member 415 may be disposed between the air hole 411 and the first hole 412. The first waterproof member 415 may be disposed between the bottom cover 110 and the bracket 300. The first waterproof member 415 may be disposed on the second surface of the bracket 300.

When a pipe is disposed in the first hole 412, the first waterproof member 415 may be installed in the pipe. Alternatively, when a pipe is disposed in the first hole 412, the first waterproof member 415 may be omitted. In this case, moisture may not flow into the first hole 412 due to the narrow diameter of the pipe.

The sound device 10 may include a second waterproof member 424 disposed in the vent hole 421. The second waterproof member 424 may cover the vent hole 421. The second waterproof member 424 may be located on the inner surface of the bottom cover 110. Alternatively, when the pipe 422 is inserted into the vent hole 421, the second waterproof member 424 may be located on the outer surface of the bottom cover 110.

When the pipe is disposed in the vent hole 421, the second waterproof member 424 may be installed in the pipe. Alternatively, when the pipe is disposed in the vent hole 421, the second waterproof member 424 may be omitted. In this case, moisture may not flow into the vent hole 421 due to the narrow diameter of the pipe.

The sound device 10 may include a third waterproof member 434 disposed in the second air path P2 of the sound device 10. The third waterproof member 434 may be disposed in the inner hole 431 (refer to FIGS. 13 and 18). The third waterproof member 434 may be disposed in the bracket 300. The third waterproof member 434 may be disposed on the second surface of the bracket 300. Alternatively, the third waterproof member 434 may be disposed on the first surface of the bracket 300.

The sound device 10 may include a fourth waterproof member disposed in the inner microphone M. The fourth waterproof member may cover the inner microphone M.

The sound device 10 may include at least one waterproof member among a first waterproof member 415, a second waterproof member 424, a third waterproof member 434, and a fourth waterproof member. The sound device 10 may selectively apply at least one waterproof member, among the first waterproof member 415, the second waterproof member 424, the third waterproof member 434, and the fourth waterproof member according to a desired degree of waterproofing. The first waterproof member 415, the second waterproof member 424, the third waterproof member 434, or the fourth waterproof member may have a different IPX waterproof rating. The first waterproof member 415, the second waterproof member 424, the third waterproof member 434, or the fourth waterproof member may have the same IPX waterproof rating.

Referring to FIG. 15, the air hole 411 may penetrate the bottom cover 110 and may be located adjacent to the back chamber BC. The air hole 411 may communicate with the front chamber FC through the first air path P1. The first air path P1 may be formed inside the bracket 300 located in the back chamber BC. The first air path P1 may be defined as a path including an air hole 411, a first hole 412, a groove 413, a second hole 414, and a through hole 223*a* (refer to FIG. 15). The first air path P1 may include a first section and a second section extending in a direction intersecting with the extending direction of the first section. The first section may be a portion of the first air path P1 formed in the first hole 412 and the groove 413, and the second section may be a portion of the first air path P1 formed by the second hole 414 and the through hole 223*a*. The first air path P1 may further include a third section connected to the first section. The third section may be a portion of the first air path P1 formed between the air hole 411 and the first hole 412. The third section may extend in a direction that intersects with the extending direction of the first section at a certain angle. Extending direction of each of the first to third sections may be different from each other. Length in the extending direction of each of the first to third sections may be different from each other. For example, the length of the first section may be smaller than the length of the second section, and may be greater than the length of the third section. However, the present invention is not limited thereto, and the overall length of the first air path P1 and the length of each section may be set differently according to the set sound condition.

A pipe may be inserted into the first air path P1. The pipe inserted into the first air path P1 may guide external sound to flow into the first air path P1. The pipe may be installed in the entire section of the first air path P1. The pipe may be installed in a portion of the first air path P1. For example, the pipe may be inserted into the first hole 412.

The second hole 414 may be formed by penetrating the second protrusion 350 of the bracket 300, and the second protrusion 350 may contact the first protrusion 223 of the partition wall 220. The second hole 414 may communicate with the through hole 223*a* of the first protrusion 223. Thus, the air hole 411 may not communicate with the back chamber BC, and may communicate with the front chamber FC. The external sound may flow into the front chamber FC through the air hole 411 and the first air path P1, and may be received by the inner microphone M. The air hole 411 and the first air path P1 may form an independent path that does not share a noise pass with the back chamber BC. Thus, an external sound can be accurately received without distortion, thereby improving the noise canceling function. In addition, an internal pressure that can be generated when the sound device 10 is worn may be released through the first air path P1 and the air hole 411 directly connected to the outside. Thus, the pressure in the inner ear canal can be alleviated. In addition, through the air hole 411 and the first air path P1, the level of the middle-band and low-band may be adjusted, and the sound may be improved.

Figure 17:
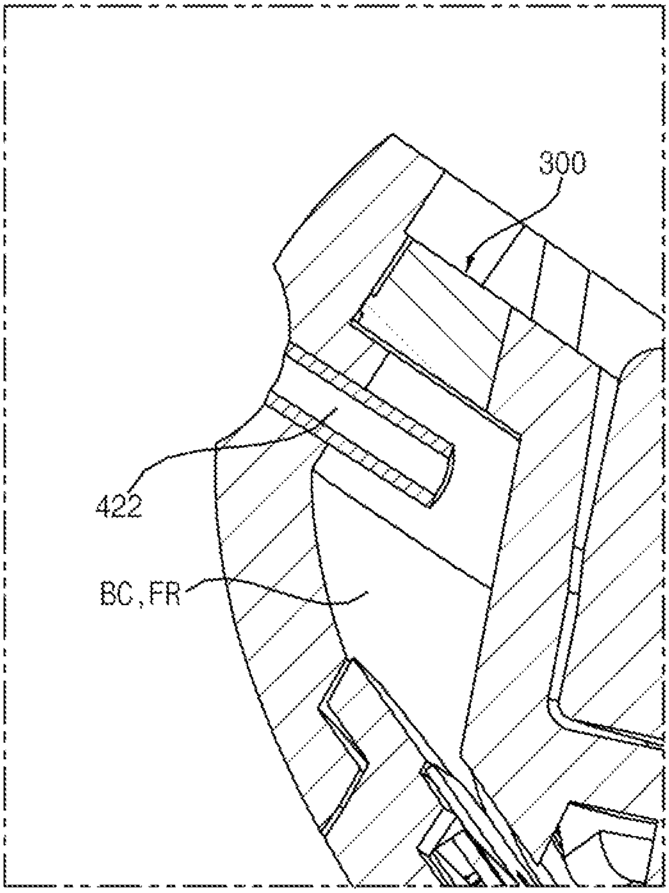

Referring to FIGS. 16 and 17, the vent hole 421 may be formed by penetrating the bottom cover 110, and may communicate the back chamber BC with the outside. The vent hole 421 may communicate the outside with the front room FR of the back chamber BC. The vent hole 421 may be formed in a position where the vent hole 421 is not blocked when the sound device 10 is worn. The vent hole 421 may not communicate with the first air path P1. The vent hole 421 may communicate with the front room FR, and may not communicate with the front chamber FC. The vent hole 421 may form an independent structure that does not share a noise pass with the front chamber FC. External sound may flow into the internal space of the sound device 10 through the vent hole 421, may penetrate the vibrating member of the transducer 200 to move to the front chamber FC, and may be received by the inner microphone M. The vent hole 421 may adjust the level of the low-band. The pipe 422 may be inserted into the vent hole 421, and the pipe 422 may improve the level adjusting of the middle-band and low-band. Thus, the sound device 10 may output an improved sound.

Figure 18:
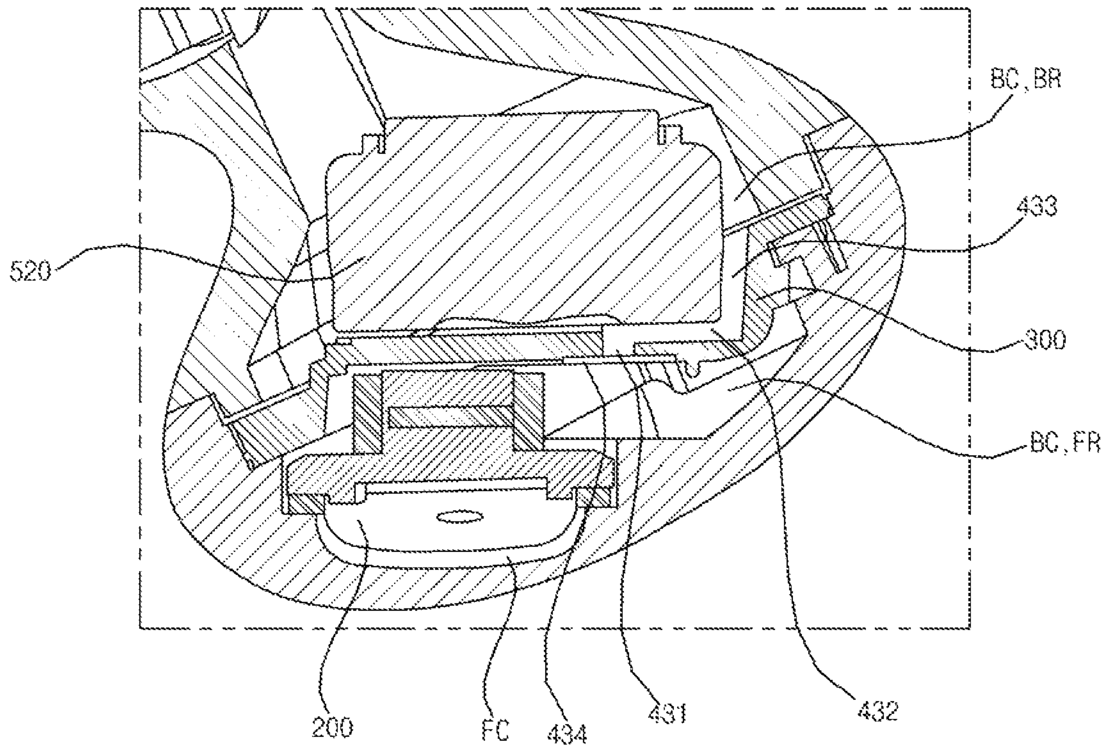

Referring to FIG. 18, the inner hole 431 may be formed by penetrating the bracket 300. The inner hole 431 may expand the space of the front room FR in which the transducer 200 is located. Thus, an improved sound can be provided. The second air path P2 may include a first inner groove 432 and a second inner groove 433 that are connected to the inner hole 431. The sound generated in the transducer 200 may move while passing through the inner hole 431, the first inner groove 432, and the second inner groove 433. The inner hole 431 can adjust the flatness level of the 500 Hz to 3 kHz band, and can improve a sound.

Referring to FIGS. 1 to 18, the sound device according to an aspect of the present disclosure may include: a transducer; a housing being accommodated the transducer, and having a front chamber and a back chamber that face each other with respect to the transducer; and a microphone disposed inside the front chamber, wherein the housing includes: a speaker hole formed from an outer surface of the housing toward the front chamber; and a hole formed from the outer surface of the housing toward the outside of the back chamber; wherein air that has passed through the hole flows into the front chamber through an inner space of the housing independent of the back chamber, wherein the transducer outputs sound based on sound information received by the microphone.

The sound device may include the inner space of the housing independent of the back chamber is provided as an air path communicating the hole and the front chamber.

The sound device may include a partition wall coupled to the transducer and partitioning the front chamber and the back chamber, wherein the partition wall includes a through hole penetrating the partition wall, and wherein the inner space of the housing independent of the back chamber is located in the back chamber and is defined as an air path connecting the hole and the through hole.

The sound device may include a bracket located in the back chamber, and facing the partition wall with respect to the transducer, and on which a substrate is disposed; wherein the air path further includes: a first hole formed in the bracket, and facing the hole; a second hole formed in the bracket, and facing the through hole; and a groove formed in the bracket, and formed between the first hole and the second hole.

The partition wall may include a first protrusion protruding from at least a portion of the partition wall toward the bracket, wherein the bracket includes a second protrusion protruding from at least a portion of the bracket toward the partition wall, and in contact with the first protrusion, wherein the through hole of the partition wall is formed on the first protrusion, and the second hole of the bracket is formed on the second protrusion.

The bracket may partition the back chamber into a front room located in a forward direction of the bracket and a back room located in a rearward direction of the bracket, wherein the groove is opened toward the back room, and wherein a cover member for covering the groove and the second hole is disposed on the bracket.

The air path may include: a first section extending from the hole, and a second section connecting the first section and the through hole, and being extended in a direction perpendicular with an extending direction of the first section.

In the sound device may include a waterproof member is disposed between the hole and the first hole of the bracket.

The bracket may partition the back chamber into a front room located in a forward direction the bracket and a back room located in a rearward direction of the bracket, wherein the bracket includes an inner hole spaced apart from the first and second holes, and penetrating the bracket, and wherein the front room communicates with the back room, through the inner hole.

The sound device may include a waterproof member located on the inner hole.

The sound device may include a vent hole formed from the outer surface of the housing toward the back chamber.

The sound device may include a pipe inserted into the vent hole.

The sound device may include a waterproof member located on the vent hole.

The housing may include a bottom cover having the front chamber and the back chamber formed therein, a nozzle coupled to the front chamber side of the bottom cover and being formed the speaker hole, and a top cover coupled to the back chamber side of the bottom cover, wherein the hole is located in any one position of a first position located at a first height from the nozzle, and a second position that is different from the first height from the nozzle and located closer to the top cover than the first position, wherein the vent hole is located in the other position of the first position and the second position.

An inner space of the nozzle may form a portion of the front chamber, and the microphone is disposed in the inner space of the nozzle.

The effect of the sound device according to the present disclosure will be described as follows.

According to at least one of embodiments of the present disclosure, a sound device including an active noise canceling function may be provided.

According to at least one of the embodiments of the present disclosure, a sound device having a high level of noise canceling performance may be provided.

According to at least one of the embodiments of the present disclosure, a sound device having an improved sound performance may be provided.

According to at least one of the embodiments of the present disclosure, it is possible to provide a sound device having an improved internal pressure that may occur when worn.

According to at least one of the embodiments of the present disclosure, it is possible to provide a sound device having an improved waterproof performance.

Certain embodiments or other embodiments of the disclosure described above are not mutually exclusive or distinct from each other. Any or all elements of the embodiments of the disclosure described above may be combined or combined with each other in configuration or function.

For example, a configuration described in one embodiment of the disclosure and the drawings and a configuration described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A sound device comprising:
- a housing;
- a bracket located inside the housing and partitioning an inner space of the housing into a first chamber and a second chamber;
- a transducer located in the first chamber; and
- a microphone located in the first chamber,
- wherein the housing comprises:
- a speaker hole located at a portion of the housing defining a boundary of the first chamber; and
- an air hole located at a position of the housing contacting the bracket,
- wherein the bracket comprises an air path extending through the bracket, the air path having an inlet facing the air hole and an outlet facing the first chamber, the air path being independent of the second chamber, and
- wherein the transducer is configured to output sound based on sound information received by the microphone.

2. The sound device of claim 1, further comprising a partition wall coupled to the transducer, the partition wall including a through hole extending through the partition wall.

3. The sound device of claim 2, wherein the air path includes:
- a first section extending from the air hole in a first direction; and
- a second section connecting the first section to the through hole, the second section extending in a second direction perpendicular to the first direction.

4. The sound device of claim 2,
- wherein the air path further includes:
  - a first hole located in the bracket, facing the air hole, and defining the inlet of the air path;
  - a second hole located in the bracket, facing the through hole, and defining the outlet of the air path; and
  - a groove located in the bracket, the groove extending between the first hole and the second hole.

5. The sound device of claim 4, wherein the partition wall further comprises a first protrusion protruding from at least a portion of the partition wall toward the bracket, the through hole being located in the first protrusion, and
- wherein the bracket further comprises a second protrusion protruding from at least a portion of the bracket toward the partition wall, the second protrusion directly contacting the first protrusion, the second hole being located in the second protrusion.

6. The sound device of claim 4, wherein the partition wall is located in the first chamber, wherein the inner space of the housing comprises:

a front chamber located between the partition wall and the speaker hole of the housing;

a front room located between the bracket and the partition wall; and a back room located opposite the front room with respect to the bracket and defining the second chamber, and wherein the groove is opened toward the back room.

7. The sound device of claim 6, further comprising a cover member covering the groove and the second hole on the bracket.

8. The sound device of claim 4, further comprising a waterproof member located between the air hole and the first hole of the bracket.

9. The sound device of claim 4, wherein the partition wall is located in the first chamber, wherein the inner space of the housing comprises:

a front chamber located between the partition wall and the speaker hole of the housing;

a front room located between the bracket and the partition wall; and a back room located opposite the front room with respect to the bracket and defining the second chamber, and wherein the bracket further comprises an inner hole spaced apart from the air path, the inner hole extending through the bracket such that the front room communicates with the back room through the inner hole.

10. The sound device of claim 9, further comprising a waterproof member located at the inner hole.

11. The sound device of claim 1, wherein the housing further includes a vent hole at a portion of the housing defining a boundary of the second chamber.

12. The sound device of claim 11, further comprising a pipe inserted into the vent hole.

13. The sound device of claim 11, further comprising a waterproof member located at the vent hole.

14. The sound device of claim 11, wherein the housing further includes:

a bottom cover defining the first chamber and the second chamber;

a nozzle located at the first chamber, the nozzle including the speaker hole;

and a top cover coupled to the bottom cover, wherein the air hole is located at one of a first position located at a first height from the nozzle or a second position at a second height from the nozzle, the second position being located closer to the top cover than the first position is located with respect to the top cover, and wherein the vent hole is located at another of the first position or the second position.

15. The sound device of claim 14, wherein an inner space of the nozzle is in communication with a front portion of the first chamber, and wherein the microphone is disposed in the inner space of the nozzle.

16. The sound device of claim 11, further comprising a partition wall coupled to the transducer and located in the first chamber.

17. The sound device of claim 16, wherein the inner space of the housing comprises:

a front chamber located between the partition wall and the speaker hole of the housing;

a front room located between the bracket and the partition wall; and a back room located opposite the front room with respect to the bracket and defining the second chamber, wherein the vent hole faces the front room.

18. The sound device of claim 1, further comprising a partition wall coupled to the transducer and located in the first chamber.

19. The sound device of claim 18, wherein the inner space of the housing comprises:

a front chamber located between the partition wall and the speaker hole of the housing;

a front room located between the bracket and the partition wall; and a back room located opposite the front room with respect to the bracket and forming the second chamber, and wherein the sound device further comprises a power supply located in the back room.

20. The sound device of claim 1, wherein the inlet of the air path is located at a lateral side of the bracket.

* * * * *